(12) United States Patent
Stewart

(10) Patent No.: US 10,978,289 B2
(45) Date of Patent: Apr. 13, 2021

(54) METHODS AND APPARATUS FOR ION FRAGMENTATION IN A MASS SPECTROMETER

(71) Applicant: Thermo Fisher Scientific (Bremen) GmbH, Bremen (DE)

(72) Inventor: Hamish Stewart, Bremen (DE)

(73) Assignee: Thermo Fisher Scientific (Bremen) GmbH, Bremen (DE)

(*) Notice: Subject to any disclaimer, the term of this patent is extended or adjusted under 35 U.S.C. 154(b) by 0 days.

(21) Appl. No.: 16/168,707

(22) Filed: Oct. 23, 2018

(65) Prior Publication Data
US 2019/0157065 A1    May 23, 2019

(30) Foreign Application Priority Data

Nov. 20, 2017  (GB) ...................................... 1719226

(51) Int. Cl.
| | | |
|---|---|---|
| H01J 49/00 | (2006.01) | |
| H01J 49/42 | (2006.01) | |
| G01N 30/72 | (2006.01) | |
| H01J 49/06 | (2006.01) | |
| H01J 49/16 | (2006.01) | |

(52) U.S. Cl.
CPC ...... H01J 49/4225 (2013.01); G01N 30/7233 (2013.01); H01J 49/0072 (2013.01); H01J 49/067 (2013.01); H01J 49/165 (2013.01); H01J 49/427 (2013.01); H01J 49/4265 (2013.01)

(58) Field of Classification Search
CPC ........ H01J 49/00; H01J 49/02; H01J 49/0027; H01J 49/0031; H01J 49/0045; H01J 49/0072; H01J 49/4225; H01J 49/062; H01J 49/063; H01J 49/065; H01J 49/066
USPC .............................. 250/281, 282, 283, 288
See application file for complete search history.

(56) References Cited

U.S. PATENT DOCUMENTS

| | | |
|---|---|---|
| 7,145,139 B2 | 12/2006 | Syka |
| 7,425,699 B2 | 9/2008 | Makarov et al. |
| 8,604,419 B2 | 12/2013 | Nolting et al. |
| 9,312,114 B2 | 4/2016 | Hock et al. |

(Continued)

FOREIGN PATENT DOCUMENTS

| | | |
|---|---|---|
| GB | 2460506 A | 12/2009 |
| WO | 2009/085794 A2 | 7/2009 |

(Continued)

*Primary Examiner* — Jason L McCormack
(74) *Attorney, Agent, or Firm* — Thomas F. Cooney

(57) ABSTRACT

A method of fragmenting ions comprises: injecting first ions of a first charge into an ion trap that includes an elongate multipole electrode assembly defining an elongate ion channel; radially confining the first ions within the ion channel by applying an RF pseudopotential to the electrode assembly and axially confining said ions to a first volume within the ion channel by applying a first potential well to the ion channel; injecting second ions of a second charge opposite to the first charge into the ion trap; axially confining the second ions to a second volume within the ion channel by applying a second potential well to the ion channel, the first potential well being within the second potential well; cooling the first and second ions in the ion trap; and allowing the ions to interact such that the first ions and/or second ions are fragmented to produce product ions.

13 Claims, 10 Drawing Sheets

(56) References Cited

U.S. PATENT DOCUMENTS

| | | | |
|---|---|---|---|
| 2002/0100870 A1 | 8/2002 | Whitehouse et al. | |
| 2002/0127566 A1 | 9/2002 | Hirabayashi et al. | |
| 2006/0255261 A1* | 11/2006 | Whitehouse | H01J 49/0431 250/288 |
| 2007/0262252 A1* | 11/2007 | Dowell | H01J 49/0468 250/282 |
| 2008/0128610 A1* | 6/2008 | McLuckey | H01J 49/4225 250/283 |
| 2009/0127453 A1 | 5/2009 | Ding et al. | |
| 2011/0186724 A1* | 8/2011 | Nolting | H01J 49/0072 250/282 |
| 2014/0353491 A1 | 12/2014 | Hager et al. | |
| 2015/0155150 A1* | 6/2015 | Bateman | H01J 9/062 250/283 |

FOREIGN PATENT DOCUMENTS

| | | |
|---|---|---|
| WO | 2010/002819 A1 | 1/2010 |
| WO | 2011/095465 A2 | 8/2011 |

\* cited by examiner

METHODS AND APPARATUS FOR ION FRAGMENTATION IN A MASS SPECTROMETER

CROSS-REFERENCE TO RELATED APPLICATION

This application claims the priority benefit under 35 U.S.C. § 119(a) to British Patent Application No. 1719226.1, filed on Nov. 20, 2017, the disclosure of which is incorporated herein by reference.

TECHNICAL FIELD

The present disclosure relates to a mass spectrometer. In particular, the present disclosure relates to a fragmentation chamber for a mass spectrometer and a method of fragmenting ions for mass analysis by mass spectrometry.

BACKGROUND

Mass spectrometry is an important technique in the field of chemical analysis. In particular, mass spectrometry may be used to analyse and identify organic compounds. The analysis of organic compounds using mass spectrometry is challenging as organic compounds can range in mass from tens of amu up to several hundred thousand amu.

In general, a mass spectrometer comprises an ion source for generating ions from a sample, various lenses, mass filters, ion traps/storage devices, and/or fragmentation device(s), and one or more mass analysers. Mass analysers may utilise a number of different techniques for separating ions of different masses for analysis. For example, ions may be separated temporally by a Time of Flight (ToF) mass analyser, spatially by a magnetic sector mass analyser, or in frequency space by a Fourier transform mass analyser such as an orbital trapping mass analyser. Mass analysing sample (i.e. precursor) ions using a mass spectrometer is often denoted as MS1 analysis.

One important component of a mass spectrometer system is an ion trap. Ion traps typically utilise a combination of static and dynamic electric fields in order to trap ions. For example, a linear multipole ion trap may confine ions in an axial direction using a static electric field and may confine ions in a radial direction using a pseudopotential well by applying an RF potential to a multipole electrode arrangement. One known type of multipole electrode arrangement is four rod-shaped electrodes arranged to provide a quadrupole electrode assembly.

One particularly useful technique for analysing organic compounds is to fragment the sample ions (precursor ions) into smaller parts (product ions). The product ions can then be mass analysed in order to infer the structure of the precursor ions. This type of mass spectrometry experiment is often denoted as MS2 (or MS/MS) analysis.

One technique for fragmenting precursor ions is Collision Activated Dissociation (CAD) in which the precursor ions are kinetically excited by an electric field in an ion trap, for example a linear multipole ion trap, that also includes a low pressure inert gas. The excited precursor ions collide with molecules of the inert gas and may fragment into product ions due to the collisions.

In a different arrangement, precursor ions may be fragmented by electron capture dissociation (ECD). In ECD, low energy electrons are captured by multiply charged positive precursor ions, which may then undergo fragmentation due to the electron capture. ECD processes are difficult to carry out in a linear multipole ion trap as the applied RF fields are not conducive for receiving low energy electrons. For example, thermal electrons introduced into a linear ion trap may maintain their thermal energies for only a fraction of a microsecond and may not be trapped. Therefore, ECD techniques are not readily applicable to many mass spectrometer systems.

Alternatively, precursor ions may be fragmented through ion/ion interactions in a process known as Electron Transfer Dissociation (ETD). Similar to ECD, ETD typically requires that the relative kinetic energy of the interacting particles be small, preferably less than (10, 5, 2) eV, optimally less than about 1 eV. However, as ions, rather than electrons, form the reagent for the process, a linear ion trap may be suitable for performing an ETD process.

Ion/ion reactions in an ion trap are typically induced by initially trapping precursor ions within an ion trap and focusing the reagent ions into the trap. In order to induce ion/ion interactions, the reagent ions are often of an opposing charge to the precursor ions. Confining ions of opposing charges within an ion trap, and causing the ions to interact is challenging, as ions of opposing charges will behave differently in response to a static electric field.

U.S. Pat. No. 8,604,419B discloses an ion trap for simultaneously trapping anions and cations via the application of an additional axial DC gradient in combination with coupled RF potential(s). The combination of the RF potential and the axial DC gradient in such an arrangement forms a pseudopotential designed to provide minima for the trapped positively and negatively charged particles that result in the overlap of the ion clouds so as to provide for beneficial ion/ion interactions.

SUMMARY

According to the first aspect of the disclosure, a method of fragmenting ions for mass spectrometry is provided. The method comprises injecting an amount of first ions of a first charge into an ion trap. The ion trap includes an elongate multipole electrode assembly arranged to define an elongate ion channel. The first ions are radially confined within the elongate ion channel by applying an RF pseudopotential to the elongate multipole electrode assembly. The first ions are axially confined to a first volume within the ion channel by applying a first potential well to the elongate ion channel. The method comprises injecting an amount of second ions of a second charge opposite to the first charge into the ion trap. The second ions are axially confined to a second volume within the elongate ion channel by applying a second potential well to the elongate ion channel. The second ions, like the first ions, are radially confined within the elongate ion channel by the RF pseudopotential applied to the elongate multipole assembly. The first potential well is provided within the second potential well. As such, the first volume lies within the second volume. The method comprises cooling the first ions and the second ions in the ion trap and allowing the first ions and the second ions to interact such that the first ions and/or the second ions are fragmented to produce product ions.

Advantageously, by providing the first potential well within the second potential well, the volume of the first ions confined within the first potential well will overlap with the volume of the second ions confined within the second potential well. As the ions are of opposing charges, the resulting space charge within the elongate ion channel will be reduced. The resulting reduction in the space charge will increase ion confinement within the first and second potential wells, thereby resulting in an improved fragmentation process, as increased confinement will bring about a higher rate of ion/ion interactions.

Advantageously, the first potential well used to constrain the first ions is independent of the potential well used to constrain the second ions. Accordingly, the first and second potential wells may be adjusted independently based on the mass to charge ratios of the first ions and the second ions. For example, the first ions may be precursor ions to be fragmented, while the second ions may be reagent ions suitable for causing the precursor ions to fragment by an ETD process. As such, the spatial distribution of the second (reagent) ions within the second potential well will engulf the spatial distribution of the first (precursor) ions within the first potential well. As such, a substantial proportion, preferably all, of the spatial distribution of the precursor ions will be exposed to reagent ions for an ETD fragmentation reaction according to the method of the first aspect.

Furthermore, as product (fragmented) ions typically have a relatively lower charge to the first and/or second ions, the product ions will experience less confinement by DC confining potential. The product ions may also be more energetic than the first or second ions (precursor or reagent ions) as a result of the fragmentation reaction. Thus, the product ions may be able to escape the confinement provided by the first and second potential wells in the elongate ion trap. By removing the product ions from the volume of the ion trap in which the ETD reaction is occurring, the product ions will not further interact with the first and/or second ions. Thus, the method according to the first aspect may reduce and/or minimise the rate at which useful product ions are destroyed by further reaction steps.

By removing the product ions from the first volume and/or second volume as they are generated, the number of ions confined within the first volume and the second volume may be reduced as the fragmentation reaction progresses. As such the fragmentation reaction may be self-quenching.

Preferably, the first potential well is defined by a first DC bias applied to a first electrode with respect to the elongate multipole electrode assembly. Preferably, the second potential well is defined by second DC biases applied to axially opposing second electrodes with respect to the elongate multipole assembly. By defining the first and second potential wells using DC biases applied to first and second electrodes respectively, the first and second ions may be axially confined using only DC potentials.

Preferably, the first electrode is positioned in a substantially central region of the second potential well. For example, the first electrode may be positioned in a substantially central region of the elongate ion channel. Thus, the spatial distribution of the second ions may overlap with substantially all of the spatial distribution of the first ions.

Preferably, a magnitude of the second potential well is greater than a magnitude of the first potential well. The second potential well may have an opposing polarity to the first potential well. For example, precursor ions for ETD fragmentation may be multiply charged, relatively high mass ions which can be axially trapped by a relatively shallow first potential well. Reagent ions may be singly charged, relatively low mass ions. Thus, the reagent ions may easily pass over the potential barrier provided by the first potential well due to their thermal energy alone, thereby creating total overlap of the reagent ion volume and the precursor ions volume. The resulting energised product ions produced by the fragmentation will be of relatively low mass and charge and will be similarly poorly trapped by the first potential well. Therefore, the product ions are likely to escape and migrate to the axial ends of the fragmentation chamber, where ETD reagents are less able to penetrate. This allows the quenching of the ETD reaction before precursor ions are fragmented to the point of analytical uselessness or charge reduced to neutrals.

Preferably, the first ions and/or the second ions are injected into the ion trap from an axial end of the ion trap.

Preferably, the second ions have a lower electron affinity than the first ions. As such, the second ions may be reagent ions which readily give up electrons to higher electron affinity precursor (first) ions during an ETD fragmentation reaction. Preferably, at least one third potential well is provided to axially confine the product ions, the third potential well having a polarity matching a polarity of the first potential well and adjacent to the second potential. The third potential well provides a region in the fragmentation chamber for collecting product ions which escape from the first and second potential wells. Advantageously, the third potential well is of an opposing polarity to the second potential well and so second (reagent) ions do not interact with product ions within the third potential well.

Preferably, a magnitude of the at least one third potential well is greater than the magnitude of the first potential well. Thus, the third potential well may effectively confine the product ions which tend to be of a higher energy than the first ions.

Preferably, a third potential well is provided adjacent to each opposing side of the second potential well in the axial direction of the elongate ion channel. By providing third potential wells on each side of the second potential well, product ions may be escaping from the first and second potential wells in either axial direction of the elongate ion channel may be confined within a third potential well.

According to a second aspect of the disclosure a mass spectrometer controller for controlling an ion trap to fragment first ions is provided. The controller is configured to cause at least one ion source to inject an amount of first ions of a first charge into an ion trap. The at least one ion source may inject the amount of first ions into the ion trap directly or via one or more ion optical devices, for example one or more ion guides, lenses, mass selectors, ion mobility separators, further ion traps and/or multipoles. In one embodiment, the first ions may be precursor ions and the ion source may inject the first ions into the ion trap via at least one mass selector, such as a quadrupole mass filter. Thereby, the first ions may be mass selected precursor ions. The ion trap includes an elongate multipole electrode assembly arranged to define an elongate ion channel. The controller is further configured to cause the ion trap to apply an RF pseudopotential to the elongate multipole electrode assembly to radially confine the first ions in the elongate ion channel, to cause the ion trap to apply a first potential well to the elongate ion channel to axially confine the first ions in the elongate ion channel, to cause the at least one ion source to inject an amount of second ions of a second charge opposite to the first charge into the ion trap, to cause the ion trap to apply a second potential well to the elongate ion channel to axially confine the second ions within the elongate ion channel wherein the first potential well is provided within the second potential well, and to cause the ion trap to cool the first ions and the second ions in the ion trap such that the first ions and/or the second ions are fragmented to produce product ions. As such, a controller for a mass spectrometer may be provided to implement the method according to the first aspect of the disclosure.

According to a third aspect of the disclosure a mass spectrometer is provided. The mass spectrometer comprises an ion trap, at least one ion source configured to inject first ions of a first charge into the ion trap and to inject second ions of an opposing second charge into the ion trap, and a mass spectrometer controller according to the second aspect of the invention. As such, the mass spectrometer according to the third aspect of the disclosure may be provided to perform the method according to the first aspect of the disclosure.

Preferably, the mass spectrometer further comprises a mass analyser. Preferably, the mass spectrometer controller is further configured to cause the ion trap to eject the product ions from the ion trap into the mass analyser and to cause the mass analyser to mass analyse the product ions. As such, the mass spectrometer may be used to perform an MS2 (MS/MS) analysis of a sample. The product ions may be ejected directly or indirectly from the ion trap into the mass analyser. In the case of indirect ejection, the product ions may be ejected first to a further ion trap and then from the further ion trap into the mass analyser.

According to a fourth aspect of the disclosure a computer program is provided. The computer program comprises instructions to cause the mass spectrometer controller according to the second aspect, or the mass spectrometer according to the third aspect to execute the method according to the first aspect.

According to a fifth aspect of the disclosure, a computer-readable medium having stored thereon the computer program according the fourth aspect is provided.

According to a sixth aspect of the disclosure a method of fragmenting ions for mass spectrometry is provided. According to the sixth aspect, the method uses ultraviolet photo dissociation (UVPD) to fragment the first ions. The method comprises injecting an amount of first ions of a first charge into an ion trap. The ion trap includes an elongate multipole electrode assembly arranged to define an elongate ion channel. The first ions are radially confined within the elongate ion channel by applying an RF pseudopotential to the elongate multipole electrode assembly. The first ions are axially confined to a first volume within the ion channel by applying a first potential well to the elongate ion channel. The method further comprises applying a second potential well of opposing polarity to the first potential well to the elongate ion channel. The first potential well is provided within the second potential well. The first ions are irradiated within the first volume with a source of ultraviolet radiation such that the first ions are fragmented to produce product ions.

As the product (fragmented) ions typically have a relatively lower charge to the first ions, the product ions will experience less confinement by the first potential well. The product ions may also be more energetic than the first ions as a result of the fragmentation reaction. Thus, at least some of, preferably all of, the product ions may be able to escape the confinement provided by the first potential well in the elongate ion trap. The presence of the second potential well of opposing polarity will axially separate the escaped product ions from the first volume. By removing the product ions from the volume of the ion trap in which the UVPD reaction is occurring, the product ions will not further interact with the first ions and/or the UV radiation. Thus, the method according to the sixth aspect may reduce and/or minimise the rate at which useful product ions are destroyed by further reaction steps.

By removing the product ions from the first volume as they are generated from the first ions, the total number of ions within the first volume may be reduced as the UVPD reaction progresses. As such the UVPD reaction may be self-quenching.

Preferably, the first potential well is defined by a first DC bias applied to at least one first electrode with respect to a DC potential of the elongate multipole electrode assembly. Preferably, the second potential well is defined by second DC biases applied to axially opposing second electrodes with respect to the DC potential of the elongate multipole assembly. By defining the first and second potential wells using DC biases applied to first and second electrodes respectively, the first ions may be axially confined, and the product ions axially separated, using only DC potentials. Advantageously, by using DC potentials, the confining effect of the first potentials well on the first ions may be independent of the mass to charge ratio of the first ions. Similarly, the ability for the product ions to escape the first potential well and be axially separate from the first ions by the second potential well may be independent of the mass to charge ratio of the product ions and/or the first ions. In particular, the method may be effective for product ions which have a mass to charge ratio which is substantially similar to a mass to charge ratio of a first ion.

Preferably, the at least one first electrode is positioned in a substantially central region of the second potential well.

Preferably, a magnitude of the second potential well is greater than a magnitude of the first potential well. For example, precursor ions for UVPD fragmentation may be multiply charged, relatively high mass ions which can be axially trapped by a relatively shallow first potential well. The resulting energised product ions produced by the fragmentation will be of relatively low mass and charge and will be poorly trapped by the first potential well. Therefore, the product ions are likely to escape and migrate to the axial ends of the fragmentation chamber. This allows the quenching of the UVPD reaction before first ions are fragmented to the point of analytical uselessness or charge reduced to neutrals.

Preferably, the first ions are injected into the ion trap from an axial end of the ion trap.

Preferably, at least one third potential well is provided to axially confine the product ions within at least one third volume, the third potential well having a polarity matching a polarity of the first potential well and adjacent to the second potential well. The third potential well provides a region in the fragmentation chamber for collecting product ions which escape from the first (and second) potential wells.

Preferably, a magnitude of the at least one third potential well is greater than the magnitude of the first potential well. Thus, the third potential well may effectively confine the product ions which tend to be of a higher energy than the first ions. Preferably, a third potential well is provided adjacent to each opposing side of the second potential well in the axial direction of the elongate ion channel. Thus, the amount of product ions captured by the third potential wells may be increased.

Preferably, the elongate multipole assembly extends in the axial direction beyond a second electrode such that the at least one third potential well is defined by the second DC bias applied to one of the second electrodes with respect to the DC potential of elongate multipole assembly. As such, the at least one third potential well may be provided using only DC biases applied to the fragmentation chamber.

Preferably, the source of ultraviolet radiation is arranged such that the at least one third volume is not substantially irradiated. As such, the third volume for confining the product ions provides a region within the elongate ion channel of the fragmentation chamber in which the product ions can be accumulated and confined without being subjected to further UVPD reactions.

Preferably, the source of ultraviolet radiation is provided in a transverse direction to the direction of elongation of the elongate ion channel. As such, the source of ultraviolet radiation may be provided to only irradiate a specific volume of the elongate ion channel. Preferably, the source of ultraviolet radiation is orientated relative to the elongate ion channel to only substantially irradiate the portion of the elongate ion channel corresponding to the first volume.

According to a seventh aspect of the disclosure a mass spectrometer controller for controlling an ion trap to fragment first ions is provided. According to the seventh aspect, the ion trap uses ultraviolet photo dissociation (UVPD) to fragment the first ions. The controller is configured to cause at least one ion source to inject an amount of first ions of a first charge into an ion trap. The at least one ion source may inject the amount of first ions into the ion trap directly or via one or more ion optical devices, for example one or more ion guides, lenses, mass selectors, ion mobility separators, further ion traps and/or multipoles. In one embodiment, the first ions may be precursor ions and the ion source may inject the first ions into the ion trap via at least one mass selector, such as a quadrupole mass filter. Thereby, the first ions may be mass selected precursor ions. The ion trap includes an elongate multipole electrode assembly arranged to define an elongate ion channel. The controller is configured to cause the ion trap to apply an RF pseudopotential to the elongate multipole electrode assembly to radially confine the first ions in the elongate ion channel. The controller is configured to cause the ion trap to apply a first potential well to the elongate ion channel to axially confine the first ions in the elongate ion channel. The controller is further configured to cause the ion trap to apply a second potential well of opposing polarity to the first potential well to the elongate ion channel to wherein the first potential well is provided within the second potential well. The controller is further configured to cause a source of ultraviolet radiation to irradiate the first ions such that the first ions are fragmented to produce product ions. As such, a controller for a mass spectrometer may be provided to implement the method according to the sixth aspect of the disclosure.

According to an eighth aspect of the disclosure a mass spectrometer is provided. According to the seventh aspect, the mass spectrometer uses UVPD to fragment first ions. The mass spectrometer comprises an ion trap, at least one ion source configured to inject first ions of a first charge into the ion trap, a source of ultraviolet radiation, and a mass spectrometer controller according to the seventh aspect of the invention. As such, the mass spectrometer according to the third aspect of the disclosure may be provided to perform the method according to the sixth aspect of the disclosure.

Preferably, the mass spectrometer further comprises a mass analyser. Preferably, the mass spectrometer controller is further configured to cause the ion trap to eject the product ions from the ion trap into the mass analyser and to cause the mass analyser to mass analyse the product ions. As such, the mass spectrometer may be used to perform an MS2 (MS/MS) analysis of a sample. The product ions may be ejected directly or indirectly from the ion trap into the mass analyser. In the case of indirect ejection, the product ions may be ejected first to a further ion trap and then from the further ion trap into the mass analyser.

According to a ninth aspect of the disclosure a computer program is provided. The computer program comprises instructions to cause the mass spectrometer controller according to the seventh aspect, or the mass spectrometer according to the eighth aspect to execute the method according to the sixth aspect.

According to a tenth aspect of the disclosure, a computer-readable medium having stored thereon the computer program according the ninth aspect is provided.

The advantages and optional features for each of the first through tenth aspects of the disclosure as discussed above apply equally to each of the other first through tenth aspects of the disclosure. In particular, the advantages and optional features for each of the first, through fifth aspects of the disclosure as discussed above apply equally to each of the other first through fifth aspects of the disclosure. In particular, the advantages and optional features for each of the sixth through tenth aspects of the disclosure as discussed above apply equally to each of the other sixth through tenth aspects of the disclosure.

BRIEF DESCRIPTION OF THE DRAWINGS

The present disclosure will now be described with reference to, by way of example only, the following figures in which.

DETAILED DESCRIPTION

Herein the term mass may be used to refer to the mass-to-charge ratio, m/z. The resolution of a mass analyser is to be understood to refer to the resolution of the mass analyser as determined at a mass to charge ratio of 200 unless otherwise stated.

Figure 1:
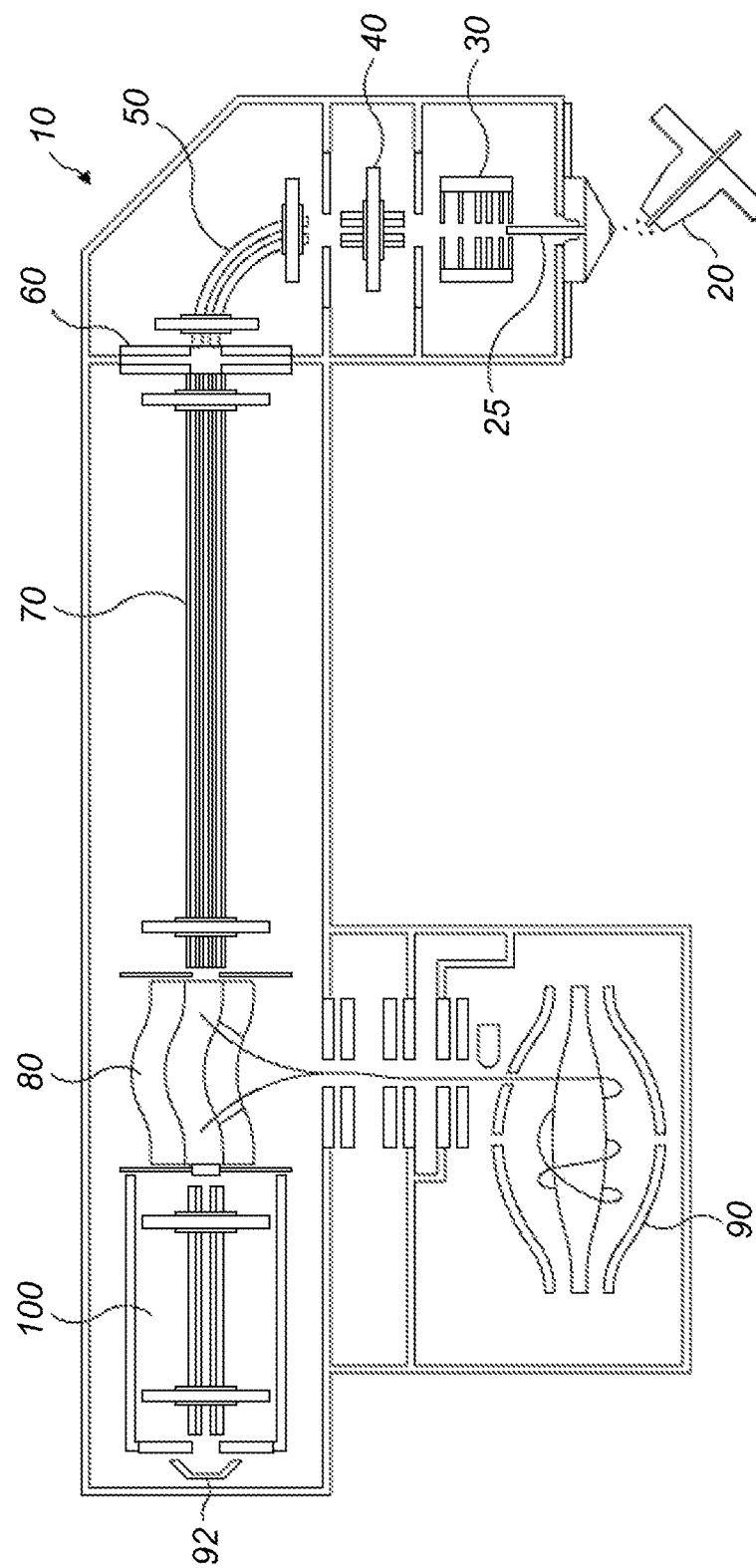
FIG. 1 shows a schematic arrangement of a mass spectrometer according to an embodiment of the present disclosure.

FIG. 1 shows a schematic arrangement of a mass spectrometer 10 suitable for carrying out methods in accordance with embodiments of the present disclosure.

In FIG. 1, a sample to be analysed is supplied (for example from an autosampler) to a chromatographic apparatus such as a liquid chromatography (LC) column (not shown in FIG. 1). One such example of an LC column is the Thermo Fisher Scientific, Inc ProSwift monolithic column which offers high performance liquid chromatography (HPLC) through the forcing of the sample carried in a mobile phase under high pressure through a stationary phase of irregularly or spherically shaped particles constituting the stationary phase. In the HPLC column, sample molecules elute at different rates according to their degree of interaction with the stationary phase.

The sample molecules thus separated via liquid chromatography are then ionized using an electrospray ionization source (ESI source) 20 which is at atmospheric pressure to form precursor ions.

The precursor ions generated by the ESI source 20 are transported to the extraction trap 80 by ion transportation means of the mass spectrometer 10. According to the ion transportation means, precursor ions generated by the ESI source 20 enter a vacuum chamber of the mass spectrometer 10 and are directed by a capillary 25 into an RF-only S lens 30. The ions are focused by the S lens 30 into an injection flatapole 40 which injects the ions into a bent flatapole 50 with an axial field. The bent flatapole 50 guides (charged) precursor ions along a curved path through it whilst unwanted neutral molecules such as entrained solvent molecules are not guided along the curved path and are lost. An ion gate 60 is located at the distal end of the bent flatapole 50 and controls the passage of the precursor ions from the bent flatapole 50 into a transport multipole 70. In the embodiment shown in FIG. 1, the transport multipole is a transport octupole. The transfer multipole 70 guides the precursor ions from the bent flatapole 50 into an extraction trap 80. In the embodiment shown in FIG. 1, the extraction trap is a curved linear ion trap (C-trap). It will be appreciated that the above described ion transportation means is one possible implementation for transporting ions from an ions source to the extraction trap 80 according to the present embodiment. Other arrangements of ion transportation optics or variations of the above assembly, suitable for transporting ions from a source to an extraction trap will be apparent to the skilled person. For example, the ion transportation means shown in FIG. 1 could be modified or replaced by other ion optical components as required. For example, at least one of a mass selector, such as a quadruple mass filter and/or a mass selecting ion trap and/or an ion mobility separator, could be provided between the bent flatapole 50 and the transfer multipole 70 to provide the capability to select ions from the ion source to be guided into the trap 80.

The extraction trap 80 is configured to confine and cool ions injected into it. Cooled ions confined in the extraction trap may be ejected orthogonally from the extraction trap towards the mass analyser 90 in order to mass analyse the precursor ions. As shown in FIG. 1, the mass analyser 90 is an orbital trapping mass analyser, for example the Orbitrap® mass analyser sold by Thermo Fisher Scientific, Inc. The orbital trapping mass analyser is an example of a Fourier Transform mass analyser. The orbital trapping mass analyser 90 has an off centre injection aperture in its outer electrode and the ions are injected into the orbital trapping mass analyser 90 as coherent packets, through the off centre injection aperture. Ions are then trapped within the orbital trapping mass analyser by a hyperlogarithmic electrostatic field, and undergo back and forth motion in a longitudinal (axial or z) direction whilst orbiting around the inner electrode.

The axial (z) component of the movement of the ion packets in the orbital trapping mass analyser is (more or less) defined as simple harmonic motion, with the angular frequency in the z direction being related to the square root of the mass to charge ratio of a given ion species. Thus, over time, ions separate in accordance with their mass to charge ratio.

Ions in the orbital trapping mass analyser are detected by use of an image current detector which produces a "transient" in the time domain containing information on all of the ion species as they pass the image detector. To provide the image current detector, the outer electrode is split in half at z=0, allowing the ion image current in the axial direction to be collected. The image current on each half of the outer electrode is differentially amplified to provide the transient. The transient is then subjected to a Fast Fourier Transform (FFT) resulting in a series of peaks in the frequency domain. From these peaks, a mass spectrum, representing abundance/ion intensity versus mass to charge ratio, can be produced.

In the configuration described above, the precursor ions are analysed by the orbital trapping mass analyser without fragmentation. The resulting mass spectrum is denoted MS 1.

Although an orbital trapping mass analyser 90 is shown in FIG. 1, other Fourier Transform mass analysers may be employed instead. For example a Fourier Transform Ion Cyclotron Resonance (FTICR) mass analyser may be utilised as mass analyser. Mass analysers, such as the orbital trapping mass analyser and Ion Cyclotron Resonance mass analyser, may also be used in the invention even where other types of signal processing than Fourier transformation are used to obtain mass spectral information from the transient signal (see for example WO 2013/171313, Thermo Fisher Scientific). In other embodiments, the mass analyser may be a time of flight (ToF) mass analyser. The ToF mass analyser may be a ToF having an extended flight path, such as multireflection ToF (MR-ToF) mass analyser.

In a second mode of operation of the C-trap 80, ions passing through transport multipole 70 into the extraction trap 80 may also continue their path through the extraction trap to exit through the opposite axial end of the trap to the end through which they entered and into the fragmentation chamber 100. The transmission or trapping of ions by the extraction trap 80 can be selected by adjusting voltages applied to end electrodes of the extraction trap. As such, the extraction trap may also effectively operate as an ion guide in the second mode of operation. Alternatively, trapped and cooled ions confined in the extraction trap 80 may be ejected from the extraction trap in an axial direction into the fragmentation chamber 100.

The fragmentation chamber 100 is configured to fragment the precursor ions to produce product ions. The construction and operation of the fragmentation chamber 100 will be discussed in more detail below. The fragmentation chamber 100 is configured to eject product ions in the axial direction back into the extraction trap 80. The extraction trap then injects the product ions into the mass analyser 90 for mass analysis. The resulting mass spectrum of the product ions is denoted MS2.

Figure 2:
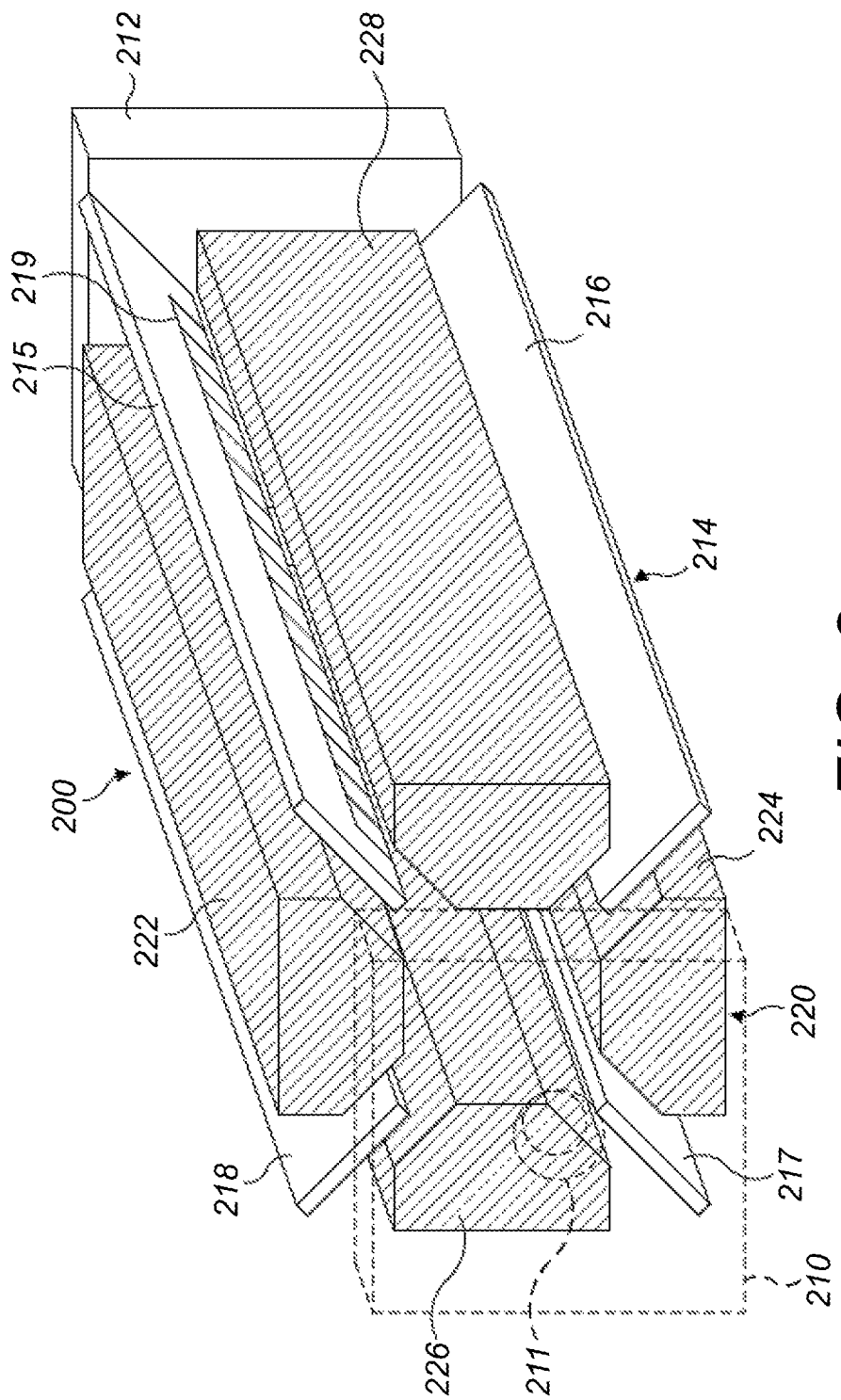
FIG. 2 shows a schematic diagram of an exemplary fragmentation chamber suitable for carrying out an exemplary method according to this disclosure.

FIG. 2 shows a schematic diagram of an exemplary fragmentation chamber 200 suitable for carrying out the method of this disclosure. As such, the fragmentation chamber 200 is an example of a fragmentation chamber 100 as shown in the mass spectrometer 10 of FIG. 1.

The fragmentation chamber 200 as shown in FIG. 2 comprises a first end electrode 210, a second end electrode 212, an elongate printed circuit board (PCB) electrode assembly 214 and an elongate multipole electrode assembly 220. The elongate multipole electrode assembly 220 and PCB electrode assembly 214 are arranged between the first end electrode 210 and the second end electrode 212.

The first end electrode 210 and the second end electrode 212 are provided at opposing axial ends of the elongate multipole electrode assembly 220. The first end electrode 210 and the second end electrode 212 may be provided as plates which extend at least substantially across a cross section of the elongate ion channel. As shown in FIG. 2, the first end electrode 210 includes an aperture 211 through the thickness of the first end electrode 210. The aperture 211 is aligned with the elongate ion channel to allow ions to be injected into the elongate ion channel and/or ejected from the elongate ion channel through the aperture 211. The second electrode 212 may also include an aperture (not shown) to allow for the injection and/or ejection of ions.

The elongate multipole electrode assembly 220 shown in FIG. 2 includes a plurality of elongate electrodes arranged about a central axis to define an elongate ion channel. The elongate multipole electrode assembly 220 as shown in FIG. 2 is an elongate quadrupole electrode assembly. The elongate multipole electrode assembly 220 includes two pairs of elongate electrodes 222, 224, 226, 228 A first pair of elongate electrodes 222, 224 are spaced apart on opposing sides of the elongate ion channel and are aligned substantially in parallel with each other along the length of the elongate ion channel. A second pair of elongate electrodes 226, 228 are also spaced apart on opposing sides of the elongate ion channel and are aligned substantially in parallel with each other along the length of the elongate ion channel. As shown in FIG. 2, the first and second pairs of elongate electrodes 222, 224, 226, 228 have substantially flat opposing surfaces. Alternatively, the opposing surfaces may have a hyperbolic profile or any other surface profile suitable for defining an RF pseudopotential (a pseudopotential well) within the elongate ion channel.

The first pair of elongate electrodes 222, 224 are spaced apart across the elongate ion channel in a direction which is perpendicular to the direction in which the second pair of elongate electrodes 226, 228 are spaced apart across the elongate ion channel in. As such, each of the elongate electrodes 222, 224, 226, 228 may be spaced apart from each other.

The elongate multipole electrode assembly 220 is provided in order to be capable of applying an RF pseudopotential to the elongate ion channel. As such, an RF varying potential may be applied to the elongate electrodes of the elongate multipole electrode assembly 220 in order to define an RF pseudopotential well within the elongate ion channel. It is understood that an RF pseudopotential may be applied to the elongate multipole electrode assembly 220 by applying an RF potential to the elongate electrodes of the elongate multipole electrode assembly in order to provide an RF pseudopotential well. The RF potential applied to each pair of elongate electrodes in the elongate multipole electrode assembly 220 is shifted in phase with respect to other pairs of electrodes in the elongate multipole electrode assembly in order to provide an average radially confining potential. For example, in the embodiment of FIG. 2 featuring two pairs of elongate electrodes, the RF potential applied to the first pair of elongate electrodes 222, 224, is 180° out of phase with the RF potential applied to the second pair of elongate electrodes 226, 228. The elongate electrodes of the elongate multipole assembly may also have a DC potential applied to them. Preferably, the DC potential of the elongate electrodes is 0V. For example, according to one embodiment, the elongate multipole electrode assembly may be arranged to apply an RF potential to the elongate ion channel with an amplitude of at least 10 V and no greater than 10000 V centred around 0 V. The elongate multipole electrode assembly may be arranged to provide an RF pseudopotential by applying an RF potential to the elongate electrodes of the elongate multipole electrode assembly which oscillates at a frequency of at least 10 kHz and no greater than 20 MHz. Preferably, the RF potential oscillates at a frequency of 3 MHz and with an amplitude of at least 100 V and no greater than 1000 V. Of course, the skilled person will appreciate that the exact RF potential amplitude and frequency may be varied depending on the construction of the elongate multipole electrode assembly and the ions to be confined.

The elongate PCB electrode assembly 214 as shown in FIG. 2 is provided as four elongate PCB boards 215, 216, 217, 218. The elongate PCB boards 215, 216, 217, 218 are aligned axially with the elongate multipole electrode assembly 220. The elongate PCB boards 215, 216, 217, 218 are provided in spaces provided between the elongate electrodes of the elongate multipole electrode assembly 220 as shown in FIG. 2.

Figure 3:
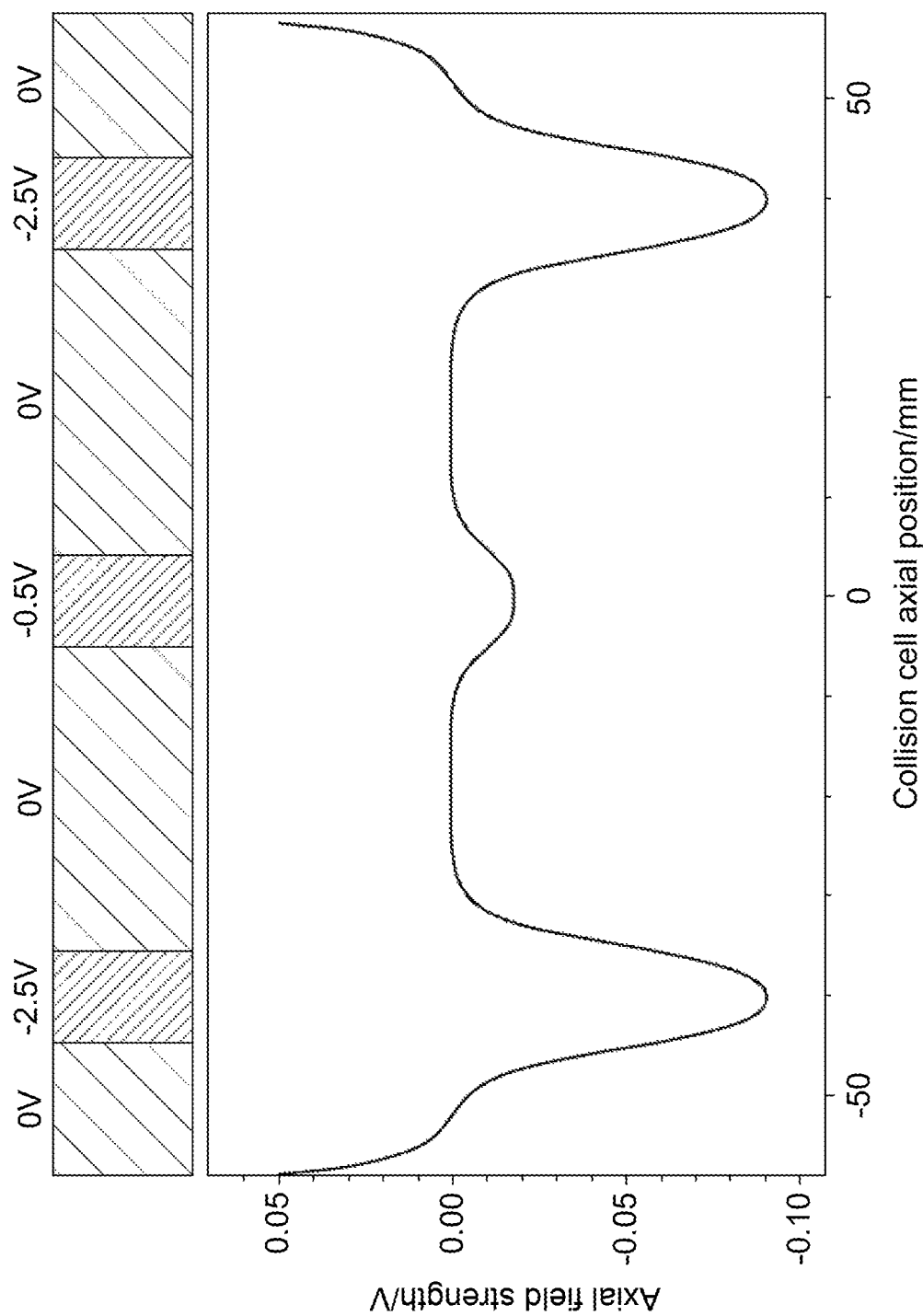
FIG. 3 shows a diagram of the variation in the electric potential in the axial direction of the elongate ion channel as a result of the first and second DC biases applied to the first electrode and the opposing second electrodes.

Each elongate PCB board 215, 216, 217, 218 may comprise a plurality of electrodes 219 extending along a length of the elongate PCB board electrode aligned with the elongate ion channel (electrodes 219 are shown only on PCB board 215 in the Figure but are provided on each PCB board 215, 216, 217, 218). As such, the plurality of electrodes 219 are positioned at least on a side of the elongate PCB board which is adjacent to, and extends along, the elongate ion channel of the fragmentation chamber 200. The plurality of electrodes 219 may include a first electrode positioned in a substantially central region of the elongate PCB board and a pair of second electrodes positioned on opposing sides of the first electrode. The first and second electrodes may be spaced apart along the length of the elongate ion channel. The plurality of electrodes may include further electrodes spaced along the length of the elongate ion channel either side of the first and second electrodes. For example, as shown in FIG. 2, the elongate PCB board electrode 215 includes 27 electrodes spaced along the length of the PCB board electrode 215. Each electrode may be independently biased with a DC voltage. Preferably, a PCB board electrode includes at least 3 electrodes, at least 5 electrodes, at least 10 electrodes or more preferably at least 15 electrodes. An example of the DC bias profile that may be provided by the plurality of electrodes 219 along the length of an elongate PCB board is shown in FIG. 3.

Each elongate PCB board electrode 215, 216, 217, 218 may have the same configuration of the plurality of electrodes described above. The elongate PCB board electrodes 215, 216, 217, 218 provide a DC bias profile for the elongate ion channel. As such, only one elongate PCB board 215 may be sufficient for providing the DC bias profile for the elongate ion channel. More preferably, at least two elongate PCB boards are provided. Even more preferably, four elongate PCB boards are provided, especially when positioned between four elongate multipole rods of a quadrupole. Preferably the elongate PCB boards are provided on opposing sides of the elongate ion channel in order to provide a DC bias profile which has an order of rotational symmetry about the elongate ion channel.

Next, an exemplary embodiment of the method of fragmenting precursor ions will be described with reference to the mass spectrometer 10 shown in FIG. 1 and the fragmentation chamber 200 shown in FIG. 2.

The mass spectrometer 10 is under the control of a controller (not shown) which, for example, is configured to control the generation of ions in the ESI source 20, to set the appropriate potentials on the electrodes of the ion transport means described above (transport quadrupole 70 etc) so as to guide, focus, and filter (where the ion transport mean comprises a mass filter) the ions, to capture the mass spectral data from the mass analyser 90 and so forth. It will be appreciated that the controller may comprise a computer that may be operated according to a computer program comprising instructions to cause the mass spectrometer 10 to execute the steps of the method according to the present disclosure.

It is to be understood that the specific arrangement of components shown in FIG. 1 is not essential to the methods subsequently described. Indeed other mass spectrometer arrangements may be suitable for carrying out the method of fragmenting precursor ions according to this disclosure.

According to the exemplary embodiment of the method, sample molecules are supplied from a liquid chromatography (LC) column as part of the exemplary apparatus described above (as shown in FIG. 1). For example, sample molecules may be a protein or peptide molecules.

In the exemplary embodiment of the method, the sample molecules may be supplied from the LC column over a duration corresponding to a duration of a chromatographic peak of the sample supplied from the LC column. As such, the controller may be configured to perform the method within a time period corresponding to the width (duration) of a chromatographic peak at its base.

As shown in FIG. 1, an orbital trapping mass analyser (denoted "Orbitrap") may be utilised to perform MS1 scans on precursor ions and MS2 scans on product (fragmented) ions.

In order to mass analyse a sample, the sample molecules from the LC column are ionized using the ESI source 20 to produce precursor ions. The ESI source 20 may be controlled by the controller to generate precursor ions with a first charge. The first charge may be a positive charge or a negative charge. According to the exemplary embodiment, the precursor ions are positively charged. Preferably, the ESI source 20 is configured to produce precursor ions which are multiply charged. As such, the ESI source is configured to produce precursor ions with a charge of at least 2+ or 2−. For example, the ESI source 20 may be configured to produce multiply protonated precursor ions.

Precursor ions subsequently enter the vacuum chamber of the mass spectrometer 10. The controller is configured to cause the mass spectrometer 10 to direct the precursor ions through capillary 25, RF-only S lens 30, injection flatapole 40, bent flatapole 50 and into the transport multipole 70 in the manner as described above.

Precursor ions then pass into the extraction trap 80 where they are accumulated. Accordingly, precursor ions of a first charge may be transported to, and injected into, extraction trap 80 according to the steps described above.

According to the exemplary embodiment it is preferable that the number of precursor ions injected into the extraction trap 80 is determined. The number of precursor ions injected into the extraction trap 80 may be determined in a number of ways. For example, in the mass spectrometer 10 shown in FIG. 1 an ion beam current of precursor ions may be measured by sampling an electrometer mounted downstream of the extraction trap 80 and immediately downstream of the fragmentation chamber 100, thus it can be inferred from said measured ion beam current the number of precursor ions injected into the ion extraction trap 80 or fragmentation chamber 100 for a given injection period. Alternatively, a small sacrificial sample of the precursor ions confined within the extraction trap 80 may be ejected from the extraction trap into the mass analyser 90 for a pre-scan process. The pre-scan process allows the mass analyser 90 to accurately determine the number of precursor ions within the packet. Together with knowledge of the injection time of the ions into the extraction trap 80, the ion current can be determined from the pre-scan. Thus, for a subsequent injection time into the extraction trap, the number of precursor ions and/or their total charge contained in the extraction trap 80 is determined. An example of a pre-scan process is described in US20140061460 A1. Other methods for counting precursor ions in the extraction trap known to the skilled person may also be suitable depending on the mass spectrometer equipment arrangement.

The controller may then cause the precursor ions to be injected from the extraction trap 80 into the mass analyser 90 in order to perform an MS1 scan. Alternatively, the controller may cause the extraction trap 80 to inject the precursor ions into the fragmentation chamber 100 for fragmentation in order to perform an MS2 scan.

Figure 4A:
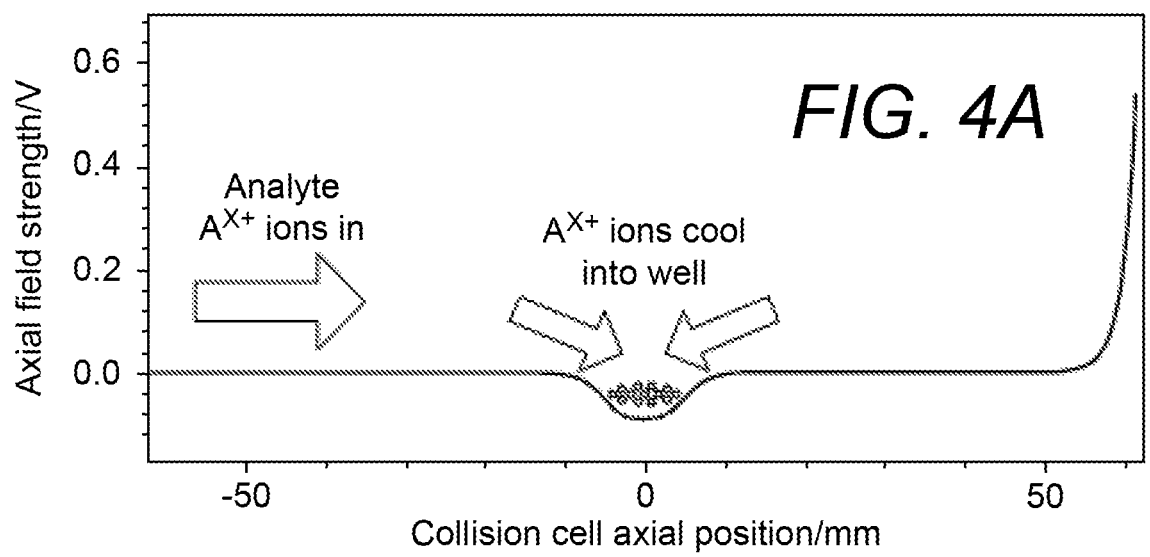
FIGS. 4A, 4B and 4C are graphical representations of the electric field along the length of the elongate ion channel within fragmentation chamber at different time points during an exemplary method according to this disclosure.
Figure 4B:
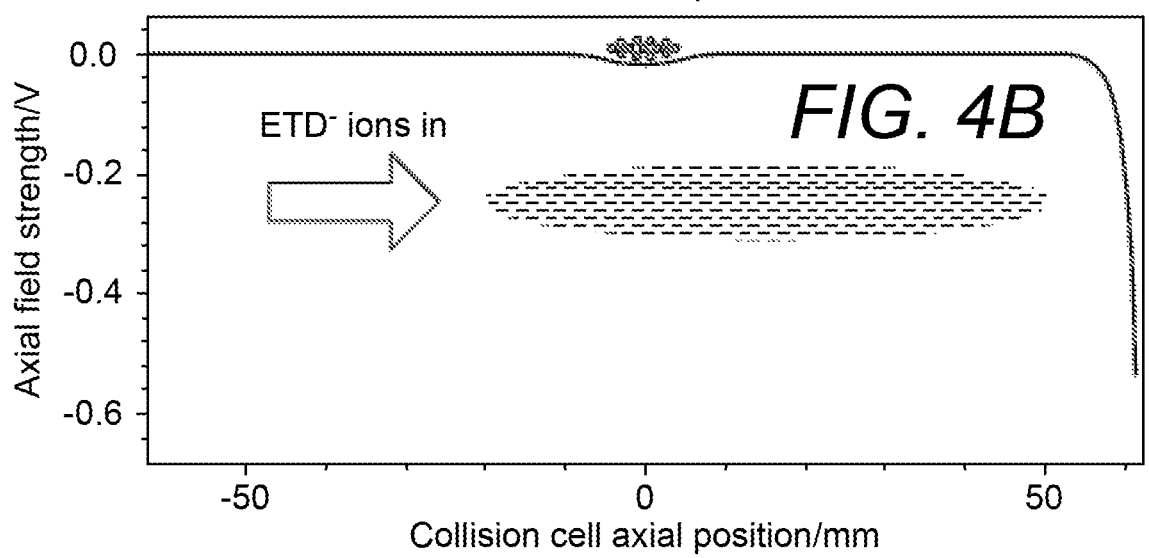
Figure 4C:
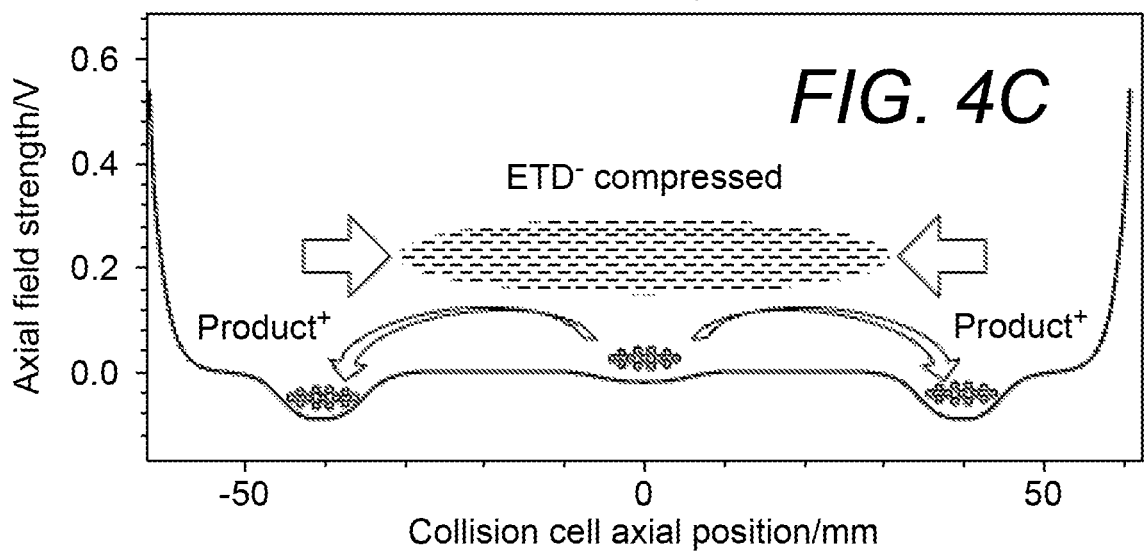

Next the control of the fragmentation chamber 100 according to the exemplary embodiment of the method will be described in more detail with reference to the fragmentation chamber 200 shown in FIG. 2. FIGS. 4A, 4B and 4C are graphical representations of the electric field along the length of the elongate ion channel within the fragmentation chamber 200 at different time points during the exemplary embodiment of the method.

According to the exemplary embodiment of the method, the precursor ions are injected into the fragmentation chamber 200 prior to the injection of the reagent ions. The precursor ions are injected as packet of precursor ions from an extraction trap (e.g. extraction trap 80 as shown in FIG. 1). Alternatively, the precursor ions may be transmitted as a continuous beam of ions from ion transportation means through the extraction trap to the fragmentation chamber 100, the ions being accumulated in the fragmentation chamber 100. As such, precursor ions may be transported to the fragmentation chamber without prior accumulation in extraction trap 80.

The controller is configured to apply an RF pseudopotential to the elongate multipole electrode assembly 220 of the fragmentation chamber 200. The RF pseudopotential applied to the elongate multipole electrode assembly 220 radially confines the precursor ions within the elongate ion channel. The RF pseudopotential is an oscillating potential applied across pairs of electrodes in the elongate multipole electrode assembly 220 in order to provide an average confining force in the radial direction for radially confining ions within the elongate ion channel. The amplitude of the oscillations may be varied depending on the range of the mass to charge ratios of the ions to be confined in the fragmentation chamber 200. The elongate multipole assembly may also have an average DC potential applied to it in addition to the RF varying potential. In the present exemplary embodiment, the DC potential of the elongate multipole assembly is set to 0 V. The frequency of the RF potential according to the exemplary embodiment is 3 MHz, and the RF potential oscillates between −500 V and +500V.

As shown in FIG. 4A, the precursor ions are injected from a first axial end of the fragmentation chamber 200. In order to accept precursor ions into the fragmentation chamber, initially no DC bias (relative to the potential of the multipole electrode assembly) is applied to the first end electrode 210 positioned at the first axial end of the fragmentation chamber 200. In order to initially confine the injected precursor ions in the fragmentation chamber 200 the controller is configured to apply an initial DC bias to the second end electrode 212. The initial DC bias applied to the second end electrodes is of the same polarity as the charge of the precursor ions to repel the precursor ions towards the centre of the elongate ion channel. For example, an initial DC bias applied to the second end electrode may be +5 V.

Once the precursor ions are contained within the ion channel, the initial DC bias may also be applied to the first end electrode 210. The initial DC bias applied to the first and second end electrodes 210, 212 acts to repel the precursor ions towards the central region of the elongate ion channel. As such, the precursor ions may be initially axially confined by the initial DC bias applied to the first and second end electrodes 210, 212.

Further, the controller is configured to apply a first DC bias to at least one first electrode of the elongate PCB electrode assembly 214. As shown in FIG. 4A, the first DC bias applied to the first electrode defines a first potential well within the elongate ion channel. As such the first potential well is defined by a first DC bias applied to a first electrode with respect to the elongate multipole electrode assembly 220. The first electrode may be positioned in a substantially central region of the elongate ion channel in order to confine the precursor ions in a substantially central region of the elongate ion channel. The first DC bias may be provided independently to the DC potential of the multipole electrode assembly 220. The first DC bias is of an opposing polarity to the initial DC bias, and thus of an opposing polarity to the precursor ions. The magnitude of the first DC bias applied to the first electrode may be less than the magnitude of the initial DC bias applied to the first and second end electrodes 210, 212. For example, the first DC bias may be −0.5 V as shown in FIG. 3.

By applying a first DC bias to the first electrode (with respect to the DC potential of the elongate multipole electrode assembly 220), a first potential well is formed in the central region of the elongate ion channel which confines the precursor ions in a central region of the elongate ion channel. Accordingly, the precursor ions may be confined within a first volume of the elongate ion channel by the first potential well. The first potential well is formed relative to the DC potential of the multipole electrode assembly 220. A magnitude of the first potential well may be defined as the energy required for an ion trapped at the bottom well to escape the well. A polarity of the potential well may be defined based on the polarity of the ions it is intended to confine. For example, a potential well with a negative polarity will confine positive ions, and a potential well with a positive polarity will confine negative ions.

The first potential well extends in the axial direction of the elongate ion channel of the fragmentation chamber 200 in order to axially confine the precursor ions. The first potential well formed around the first electrode may also be formed with respect to the initial DC biases applied to the first and second end electrodes 210, 212. As such, the spatial distribution of the precursor ions within the extraction trap may be reduced by confining the precursor ions within a central region of the elongate ion channel by the first potential well. By confining the precursor ions in a first potential well by applying the first DC potential to the first electrode, the initial DC biases applied to the first end electrode 210 and the second end electrode 212 may no longer be required to axially confine the precursor ions within the fragmentation chamber 200. Accordingly, the positively charged precursor ions may be confined (axially confined and radially confined) within the elongate ion channel of the fragmentation chamber through a combination of the first DC bias applied to the first electrode(s) and the RF pseudopotential applied to the multipole electrode assembly 220.

The method may pause for a pre-cooling time period when the precursor ions are confined within the first potential well to allow the precursor ions to cool within the fragmentation chamber 200. Preferably a pre-cooling time period is at least 0.1 ms. More preferably, the pre-cooling time period is at least 0.5 ms, 1 ms, or 1.5 ms. By pre-cooling the precursor ions, prior to the injection of the reagent ions, the cooling time subsequently needed once the precursor ions and the reagent ions are mixed in the fragmentation chamber may be reduced, thereby reducing the opportunity for unwanted reactions to occur.

Next, the controller is configured to cause a source of reagent ions to generate reagent ions for injection into the fragmentation chamber. Preferably, the reagent ions generated by the reagent ion source are of a second charge opposite to the first charge of the precursor ions. For example, according to the exemplary embodiment shown in FIG. 1, the ESI source 20 may be used to generate reagent ions of a second charge. The reagent ions may then be transported to the extraction trap 80 by the ion transportation means 25, 30, 40, 50, 60, 70 in a similar manner to the precursor ions. The reagent ions generated by the reagent ion source may be singly charged ions, or they may be multiply charged.

In some alternative embodiments, the reagent ions may have their own dedicated source. For example, a source of reagent ions may be provided as a second ESI source configured to inject reagent ions into the ion transportation means 25, 30, 40, 50, 60, 70 such that the reagent ions are injected into the ion trap from the same axial end as the precursor ions. Alternatively, the second ESI source may be positioned to inject reagent ions into the fragmentation chamber 100, 200 from an opposing axial end of the fragmentation chamber 100, 200 through an aperture in the second end electrode 212. It will be appreciated that the controller may be configured to control the first and/or second ESI sources and any supporting ion transportation means in order to provide a sequence of precursor ion injections and reagent ion injections into fragmentation chamber 100, 200 depending on the configuration of the ion transportation means according to the embodiments of this disclosure. By providing reagent ions from a second, separate, ion source, the second ion source may be operated independently of the first ion source. Accordingly, a switchover time between generating precursor ions and reagent ions may be reduced or eliminated such that the duration of the process of injecting the precursor ions and the reagent ions into the fragmentation chamber may be shortened.

Preferably, the molecules used as reagent ions have a relatively low electron affinity compared to the precursor ions. ETD reagent ions are characterised by having low electron affinity (so they give up electrons easily) and a low rate of competing proton transfer. For example, relatively low mass fused carbon rings like fluoranthene, anthracene, and phenanthrene are ideal molecules for forming reagent ions.

Next, according to the exemplary embodiment the reagent ions are injected into the extraction trap 200 whilst the precursor ions are retained by the first potential well. The reagent ions may be axially injected into the fragmentation chamber 200 through one of the end electrodes 210, 212. As shown in FIG. 4B, the reagent ions are injected through the same first end electrode 210 as the precursor ions.

It will be understood that the oscillatory nature of the RF potential applied to the multipole electrode assembly 220 to radially confine the precursor ions will also be suitable for radially confining the reagent ions. For example, the controller may be configured to apply an RF potential which oscillates between −500 V and +500 V at a frequency of 3 MHz The reagent ions may be initially axially confined within the elongate ion channel by biasing the end electrodes 210, 212 in a similar manner to the initial DC biases, but using DC biases of opposite potential. During the time period for injection the reagent ions, the precursor ions remain confined within the first potential well in the elongate ion channel.

Once the reagent ions are in the fragmentation chamber, a second DC bias may be applied to opposing second electrodes of the elongate PCB electrode assembly 214. As such, a second potential well is defined by the second DC biases applied to the opposing second electrodes with respect to the elongate multipole assembly 220. The second potential well is provided to confine the reagent ions within the second potential well. As such, the second potential well may confine the reagent ions within a second volume within the elongate ion channel. It is understood that as the reagent ions are of opposing charge to the precursor ions, the second potential well is of opposing polarity to the first potential well in order to confine the reagent ions. The second DC bias may be of the same polarity as the reagent ions. According to the exemplary embodiment, the second DC bias applied to the second electrodes is a negative bias. In order to urge the reagent ions towards the central region of the elongate ion channel the second DC bias is of a greater magnitude than the first DC bias applied to the first electrode. Thus, both the precursor ions and the reagent ions may be confined or urged towards a central region of the elongate ion channel such that the reagent ions may interact with the precursor ions.

FIG. 3 shows an exemplary diagram of the variation in the electric potential in the axial direction of the elongate ion channel as a result of the first and second DC biases applied to the first electrode and the second electrodes according to the method described above. For example, the fragmentation chamber shown in FIG. 3 may be 120 mm long with a 3 mm inscribed radius and with a trio of 5 mm long axial DC electrodes spaced along the elongate PCB electrode assembly 214. FIG. 3 also provides an indication of suitable voltages applied to the electrodes in order to produce the electric potential shown. It can be seen in FIG. 3 that a first potential well with a depth (from the bottom of the well to the top) of about 0.02 V is superimposed on a second potential well with a depth (from the bottom of the well to the top) of about −0.09 V.

For example, a method of fragmenting ions using the fragmentation chamber shown in FIG. 3 may include the following steps. Firstly, a DC voltage of −2.5 V is applied to the central electrode shown in FIG. 3. The electric potentials of the two outer DC electrodes and the entrance aperture are set to 0 V to admit precursor ions. The electric potential of the opposing end aperture is set to +5 V ions to prevent precursor ions leaving the ion channel. Precursor ions are injected into the chamber which fall into a first potential well and cool to room temperature (see FIG. 4A). The central electrode voltage is then reduced to −0.5 V to limit well depth to provide a relatively shallow potential well. Reagent ions may then be injected into the fragmentation chamber. The end aperture polarity may be reversed to stop and reflect negatively charged reagent ions as they are admitted to the ion channel (See FIG. 4B). The electric potentials of the second electrodes are subsequently set to −2.5 V to trap product ions and to compress the reagent ion cloud into the precursor ion cloud in order to promote ETD reactions between the precursor and reagent ions. The interaction of the precursor ions with the reagent ions causes fragmentation of the precursor ions to produce product ions. Subsequently the electric potentials of the first and second end electrodes may be set to +5 V to prevent product ions leaving and to define third potential wells (see FIG. 4C). The product ions formed are able to escape the first potential well and are swept out to the third potential wells which confine the product ions, thereby preventing the product ions from unintentionally escaping the fragmentation chamber.

By confining the precursor ions and the reagent ions in a substantially central region of the elongate ion channel, the precursor ions and the reagent ions may interact and fragment through ion/ion interactions. According to an exemplary embodiment of the method, the precursor ions may fragment to produce product ions by an ETD process. Where the precursor ions are multiply charged, a precursor ion may interact with a reagent ion (of opposing charge) wherein an electron is transferred between the ions. Electron transfer may cause fragmentation of the precursor ion. For example, where the precursor ion is a protein ion or a peptide ion, electron transfer may cause fragmentation of the protein ion or peptide ion along a peptide backbone of the ion. The resulting product ions generated will have the same charge polarity as the precursor ions. That is, if the precursor ions are positively charged, the resulting product ions will also be positively charged.

FIG. 4C shows a diagrammatic representation of the arrangement of the precursor ions and reagent ions within the fragmentation chamber during a fragmentation reaction. As a result of the confinement of the precursor ions and the reagent ions in potential wells, one inside the other, the reagent ion spatial distribution engulfs the precursor ion spatial distribution. Accordingly, a fragmentation process may be carried out efficiently due to the overlapping ion distributions.

Advantageously, by providing the first potential well within the second potential well, the volume of the first ions confined within the first potential well will overlap with the volume of the ions confined within the second potential well. As the ions are of opposing charges, the resulting space charge within the elongate ion channel will be reduced. The resulting reduction in the space charge will increase ion confinement within the first and second potential well, thereby resulting in an improved fragmentation process, as increased confinement will bring about a higher rate of ion/ion interactions.

Further, as shown in FIG. 4C, the product ions generated by the ETD reaction may escape the first potential well. This is because the product ions are of lower charge than the precursor ions and may be more energetic than the precursor ions. Thus, the product ions may be able to escape the relatively shallow first potential well, and be attracted towards the axial ends of the fragmentation chamber due to the opposing second DC biases. This reduces or minimises the time the product ions are further exposed to the reagent ions within a substantially central region of the elongate ion channel, such that further fragmentation of the product ions may be reduced, minimised or prevented. As such, the method according to the exemplary embodiment may be self-quenching, as the precursor ions are fragmented into product ions, which then leave the central region of the elongate ion channel.

As shown in FIG. 3 and FIG. 4C, the DC potential along the axial length of the elongate PCB electrode assembly 214 during a fragmentation reaction may include third potential wells for collecting the product ions. The third potential wells are of the same polarity as the first potential well, and of opposing polarity to the second potential well. The third potential wells are spaced apart from the first potential well. The third potential wells are spaced apart on opposing sides of the second potential well. The third potential wells may be formed by DC biases, at least in part, applied to the plurality of electrodes 219 in the elongate PCB electrode assembly 214 and/or the first and second end electrodes 210, 212 of the fragmentation chamber. For example, the elongate multipole assembly may extend in the axial direction of the elongate ion channel beyond the second electrodes. As such the third potential wells may be defined by the second DC bias applied to the second electrodes with respect to the DC potential of the elongate multipole assembly on either axial side of the second electrodes. As such, the third potential wells are formed adjacent to the second potential well.

It will be appreciated that due to the second DC biases applied to the second electrodes, the third potential wells formed will be substantially free of reagent ions. Thus, product ions trapped within the third potential wells are not subjected to further ETD reactions. In some embodiments, only one third potential well may be formed towards one axial end of the elongate ion channel.

According to the exemplary method, once the precursor ions have been fragmented, the controller may cause the fragmentation chamber 100 to eject the product ions generated by the fragmentation process into the extraction trap 80. This may be achieved by applying an axial potential gradient across the fragmentation chamber 100 in a direction so as to eject the positively charged product ions towards the extraction trap 80. The axial potential gradient may be provided for example by applying appropriate DC biases to the plurality of electrodes 219 extending along the length of the elongate PCB boards 215, 216, 217, 218. The controller may then cause the extraction trap 80 to eject the product ions into the mass analyser 90 for mass analysis (i.e. an MS2 scan). Steps for transporting the product ions from the extraction trap 80 to the mass analyser 90 are similar to the steps for the MS1 scan.

The fragmentation chamber 200 according to the exemplary embodiment may include a cooling gas. The cooling gas may interact with the precursor ions and the reagent ions in order to cause the precursor ions and/or the reagent ions to lose energy through interactions with the cooling gas. Accordingly, by interacting with the cooling gas the precursor ions and/or the reagent ions may lose energy such that they cool and their spatial distribution is further reduced accordingly. Furthermore, during a cooling time period over which the ions cool the precursor ions may interact with the reagent ions such that a fragmentation reaction occurs. Preferably, the cooling gas is an inert gas. For example, the cooling gas may be Nitrogen gas ($N_2$) or a Noble gas (such as He). Preferably, a pressure for the cooling gas is at least 0.1 Pa. Preferably, a pressure for the cooling gas is no greater than 2 Pa. Preferably the cooling period for cooling the precursor ions and the reagent ions within the fragmentation chamber 200 is no greater than 2 ms. More preferably the time period for cooling the precursor ions and the reagent ions within the ion trap is no greater than: 1.5 ms, 1 ms, or 0.5 ms.

Figure 5A:
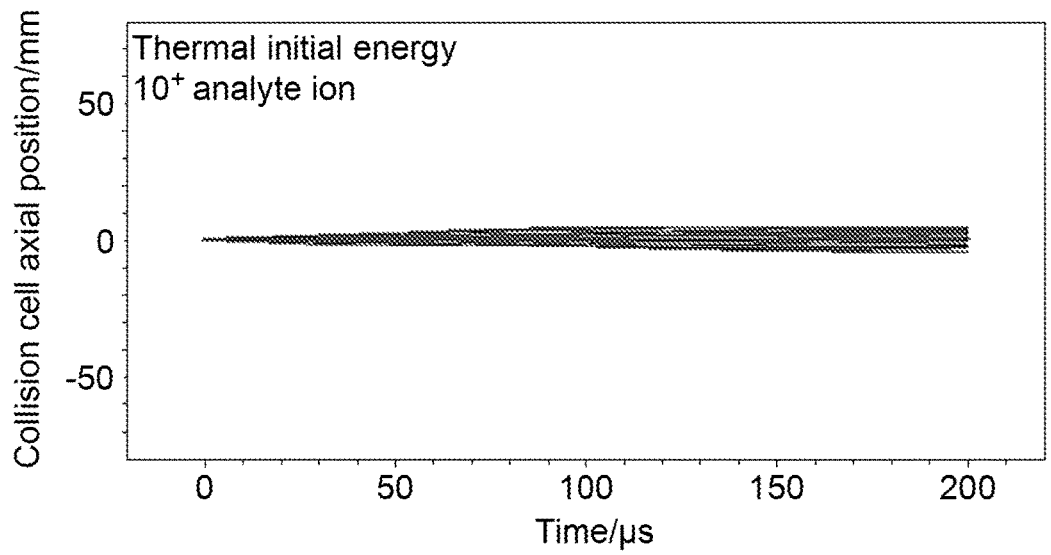
FIGS. 5A and 5B show diagrams of results produced by a computer simulation of the behaviour of precursor ions (FIG. 5A) and product ions (FIG. 5B) inside a fragmentation chamber according to this disclosure.
Figure 5B:
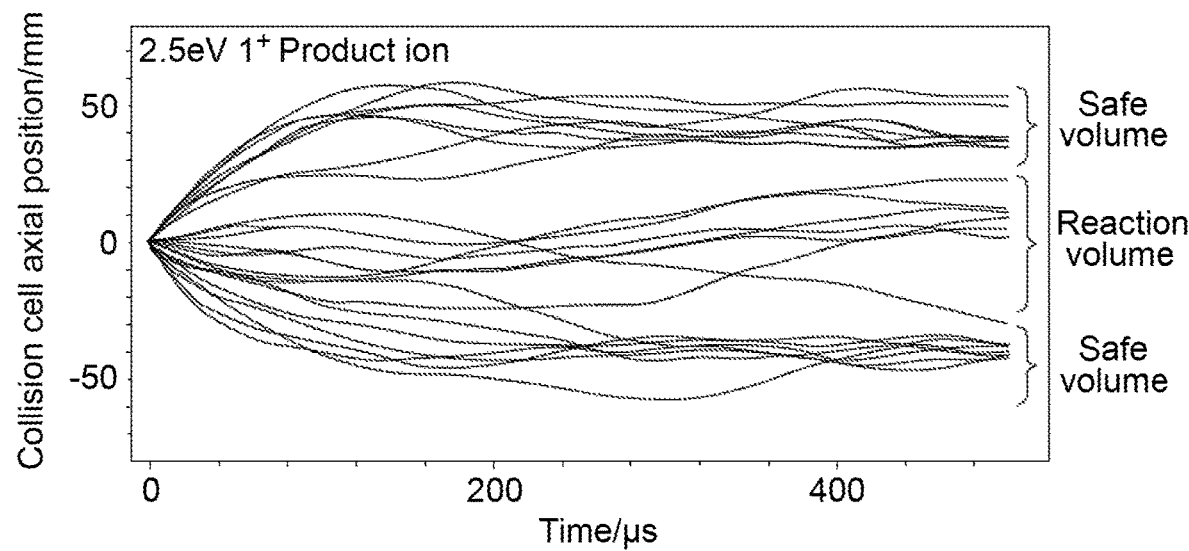

FIGS. 5A and 5B show diagrams of a results generated by a computer simulation of the behaviour of precursor ions and product ions inside a fragmentation chamber. The simulation was performed using MASIM 3D. The simulation was set up to model the fragmentation chamber electric potential shown in FIG. 3. As such, a 120 mm long elongate ion channel with a 3 mm inscribed radius and with a trio of 5 mm long axial DC electrodes spaced along the elongate ion channel was modelled. The simulation assumes that elongate ion channel contains a buffer gas of $N_2$ with a pressure of 1 Pa. The DC biases as indicated in FIG. 3 were applied to the trio of electrodes. The simulation models the behaviour of a number of precursor ions and a number of product ions over time. The simulation models the axial positions of the precursor ions and the product ions from an initial time point where the ions are confined within a central region of the ion channel and subjected to the first, second and third potential wells according to this disclosure.

FIG. 5A shows a plot of the axial positions within the ion channel of a plurality of precursor ions over time. The point 0 mm represents a centre point of the ion channel. As shown in FIG. 5A, the precursor ions remain confined within a relatively narrow central region of the ion channel over time as a result of the first potential well. FIG. 5B shows a plot of the axial positions within the ion channel of a plurality of product ions. The product ions modelled were assumed to have an energy of 2.5 eV as a result of an ETD reaction. As shown in FIG. 5B, the product ions are capable of escaping the first relatively shallow potential well and moving to the outer regions of the ion channel. As such, the product ions are confined within the third potential wells. As such, the simulation results indicate that precursor ions may be contained within a first, relatively central potential well, whilst product ions simultaneously migrate through the ions channel to the ETD reagent free trapping regions.

Figure 6:
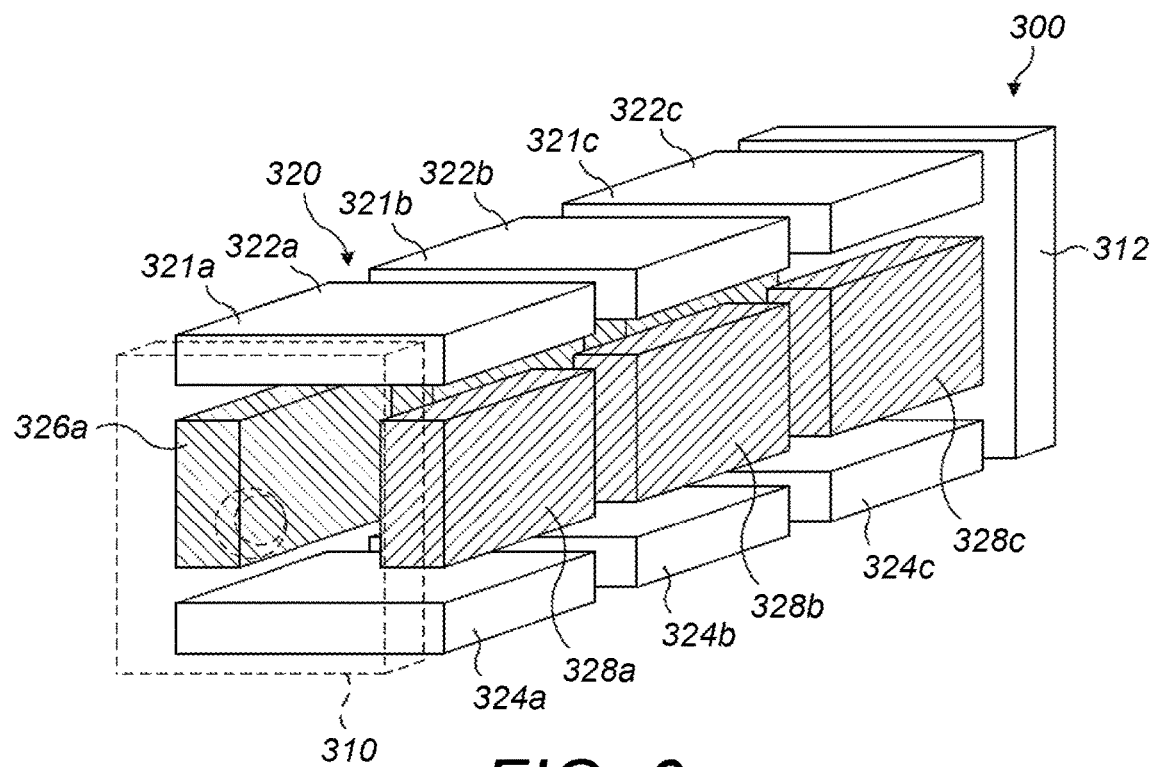
FIG. 6 shows a schematic diagram of an alternative fragmentation chamber suitable for carrying out methods according to the this disclosure.

FIG. 6 shows a schematic diagram of an alternative fragmentation chamber 300 according to the present disclosure. Similar to the fragmentation chamber 200 shown in FIG. 2 the extraction trap 300 includes a first end electrode 310 and a second end electrode 312.

The fragmentation chamber 300 includes a segmented multipole electrode assembly 320. The segmented multipole electrode assembly includes three multipole electrode segments 321a, 321b, 321c. The three multipole electrode segments 321a, 321b, 321c may be arranged along an axis in order to define an elongate ion channel. Each multipole electrode segment includes two pairs of segmented electrodes. For example, a first multipole electrode segment 321a includes a first pair of segmented electrodes 322a, 324a and a second pair of segmented electrodes 326a, 328a. The first pair of segmented electrodes 322a, 324a are spaced apart on opposing sides of the elongate ion channel and are aligned substantially in parallel with each other along the length of the elongate ion channel. A second pair of segmented electrodes 326a, 328a are also spaced apart on opposing sides of the elongate ion channel and are aligned substantially in parallel with each other along the length of the elongate ion channel. The first pair of segmented electrodes 322a, 324a are spaced apart across the elongate ion channel in a direction which is perpendicular to the direction in which the second pair of segmented electrodes 326a, 328a are spaced apart across the elongate ion channel in. The arrangement of the first and second pairs of segmented electrodes in the first multipole electrode segment 321a is repeated in the other (second, third) segmented multipole electrode segments 321b, 321c.

The controller may be configured to apply an RF pseudopotential to the segmented multipole electrode assembly 320. The same RF pseudopotential may be applied to each of the three multipole electrode segments 321a, 321b, 321c in order to radially confine ions within the elongate ion channel of the fragmentation chamber 300. As such, the segmented multipole electrode assembly 320 may be provided as a quadrupole electrode assembly in a substantially similar fashion to the multipole electrode assembly 220 as shown in FIG. 2 and as discussed above.

In contrast to the embodiment shown in FIG. 2, the extraction trap 300 of FIG. 6 does not include a PCB electrode assembly. Rather, the segmented multipole electrode assembly 320 is segmented into three multipole electrode segments 321a, 321b, 321c which are each independently biased. For example, the controller may be configured to apply the first DC bias to a central multipole electrode segment 321b relative to a DC potential of the two outer multipole electrode segments 321a, 321c in order to provide a first potential well. The controller may be configured to apply the second DC bias to the first and second end electrodes 310, 312 in order to provide a second potential well. Thus, the fragmentation chamber 300 may confine precursor ions and reagent ions within first and second overlapping potential well in order to perform a fragmentation reaction. Product ions generated by fragmentation are then able to escape the first potential well to the first and second end electrodes 310, 312 and may be collected in an ion trap (for example C-trap 80 as per the mass spectrometer 10 shown in FIG. 1). As such, a DC bias may be applied independently to each of the multipole electrode segments 321a, 321b, 321c. In combination with the first and second end electrodes 310, 312, the fragmentation chamber 300 according to this embodiment includes at least five separate independent regions in which an independent DC bias may be applied in order to confine ions within the fragmentation chamber 300.

Figure 7:
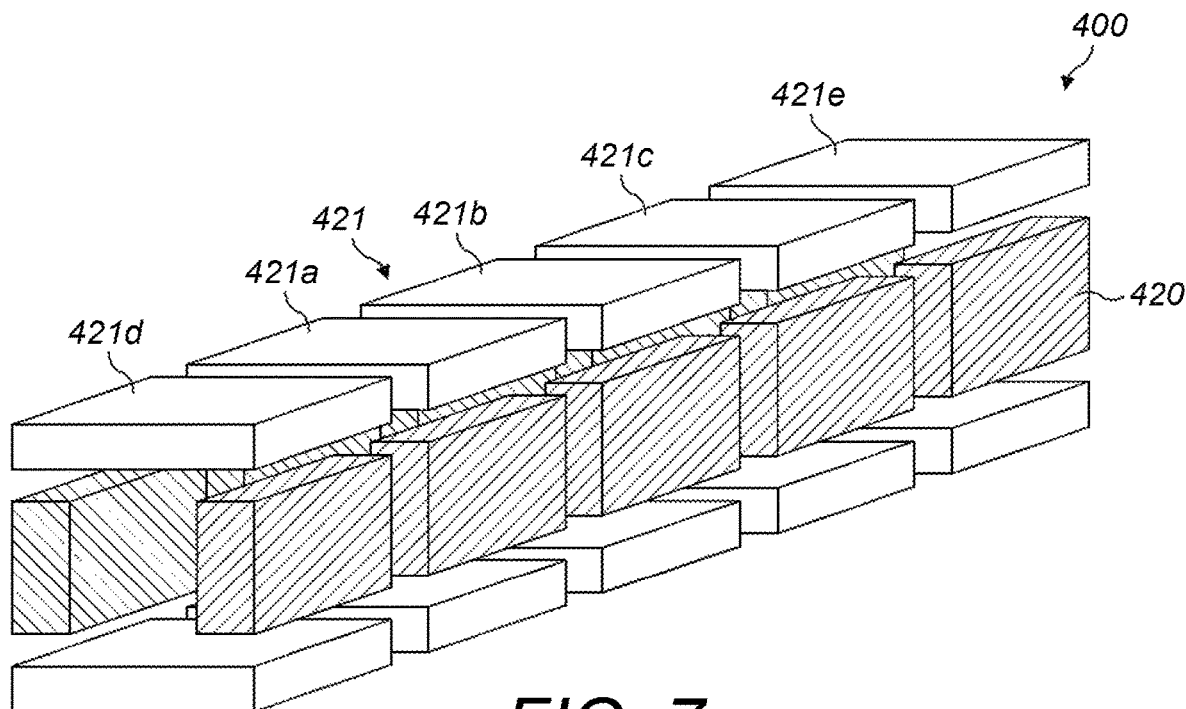
FIG. 7 shows a schematic diagram of a further alternative fragmentation chamber suitable for carrying out methods according to this disclosure.

A further alternative fragmentation chamber 400 is shown in FIG. 7. The fragmentation chamber 400 comprises a segmented multipole electrode assembly 420 including five multipole electrode segments 421a, 421b, 421c, 421d, 421e. The fragmentation chamber 400 is similar to the fragmentation chamber 300 as shown in FIG. 6 in that it includes a segmented multipole electrode assembly 420. A central portion 421 of the segmented multipole electrode assembly 420 includes three multipole electrode segments 421a, 421b, 421c, which are substantially the same as the central three multipole electrode segments of the multipole electrode assembly 320 shown in FIG. 6. Further, the fragmentation chamber 400 includes two additional multipole electrode segments 421d, 421e provided at opposing ends of the central portion 421. In comparison with the fragmentation chamber shown in FIG. 6, the additional multipole electrode segments 421d, 421e may be provided in place of the first and second end electrodes 310, 312, or alternatively first and second end electrodes may be provided in addition to the five multipole electrode segments.

The controller may be configured to apply a DC bias to each of the multipole electrode segments independently of the other segments. As such, the fragmentation chamber 400 includes at least 5 separate independent regions in which an independent DC bias may be applied in order to confine ions within the fragmentation chamber 400. As such, the fragmentation chamber 400 may be operated in a substantially similar way to the other fragmentation chamber of this disclosure. The fragmentation chamber 400 according to this embodiment may further include end electrodes (not shown) or other focusing type lenses for enabling ions to be injected and/or extracted from the extraction trap 400. Alternatively the outermost segments of the segmented multipole electrode assembly 420 may be used to control the admission of ions into the extraction trap and the initial confinement of the ions within the extraction trap 400.

Figure 8:
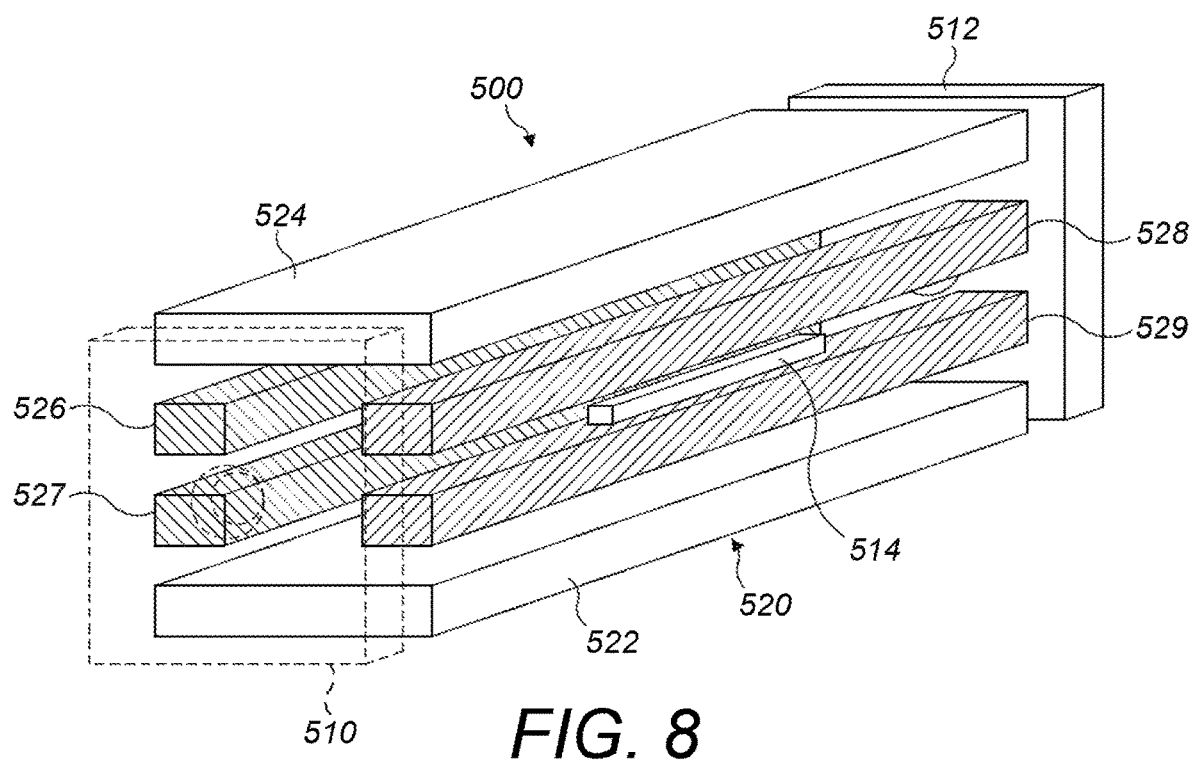
FIG. 8 shows a schematic diagram of another alternative fragmentation chamber suitable for carrying out methods according to this disclosure.

FIG. 8 shows a schematic diagram of another alternative fragmentation chamber 500 suitable for carrying out the method of this disclosure. The fragmentation chamber 500 comprises a first end electrode 510, a second end electrode 512, a pin electrode 514 and an elongate multipole electrode assembly 520. The elongate multipole electrode assembly 520 and pin electrode 514 are arranged between the first end electrode 510 and the second end electrode 512. The so-called pin electrode 514 is axially short in comparison to the elongate electrodes of the multipole electrode assembly 520.

Similar to the elongate multipole electrode assembly 220 shown in FIG. 2, the elongate multipole electrode assembly 520 shown in FIG. 8 includes two pairs of elongate electrodes arranged about a central axis to define an elongate ion channel. The first pair of elongate electrodes 522, 524 are arranged from top to bottom of the fragmentation chamber in a manner similar to the arrangement of the first pair of elongate electrodes described in relation to FIG. 2. As such the first pair of elongate electrodes are spaced apart on opposing sides of the elongate ion channel and are aligned substantially in parallel with each other along the length of the elongate ion channel.

The multipole electrode assembly also comprises a second pair of elongate electrodes, which are each split in two parts. As such, the second pair of elongate electrodes comprises first elongate split electrodes 526, 527 and second elongate split electrodes 528, 529. The first elongate split electrodes 526, 527 are spaced apart from the second elongate split electrodes 528, 529 on opposing sides of the elongate ion channel and are aligned substantially in parallel with each other along the length of the elongate ion channel. The first elongate split electrodes 526, 527 are spaced apart across the elongate ion channel from the second elongate split electrodes 528, 529 in a direction which is perpendicular to the direction in which the first pair of elongate electrodes 522, 524 are spaced apart in.

The first elongate split electrodes 526, 527 may be formed from two elongate rod-shaped electrodes. The two elongate rod electrodes are spaced apart such that an additional pin electrode may be provided between the two elongate split electrodes. The two elongate rod-shaped electrodes may be aligned in parallel along the length of the elongate ion channel.

The second elongate split electrodes 528, 529 may also be formed from two elongate rod-shaped electrodes. As shown in FIG. 8, the two second elongate split electrodes 528 and 529 are spaced apart such that the pin electrode 514 is provided in the space between them.

As shown in FIG. 8, the first pair of elongate electrodes 522, 524 and the second pair of elongate electrodes (the first elongate split electrodes 526, 527 and the second elongate split electrodes 528, 529) are arranged to form a quadrupole ion trap.

The pin electrode 514 as shown in FIG. 8 is provided as an elongate electrode which is aligned with the elongate ion channel in a central region of the elongate ion channel. Alternatively, the pin electrode 514 may be provided on both sides of the elongate ion channel (i.e. one pin electrode 514 between the two second elongate split electrodes 528 and 529 and another pin electrode between the first second elongate split electrodes 526, 527. The pin electrode(s) may also be provided as a hoop shaped, or annular electrode. As such, the pin electrode(s) may extend around a circumference of the elongate ion channel. The controller may be configured to apply the first DC bias to the pin electrode 514 such that the first potential well is formed within a substantially central region of the fragmentation chamber 500. Thus, the fragmentation chamber 500 may be controlled in manner similar to the other embodiments described above. The controller may be configured for example to apply the second DC bias to the first and second end electrodes 510, 512 in order to provide a second potential well. Thus, the fragmentation chamber 500 may confine precursor ions and reagent ions within first and second overlapping potential well in order to perform a fragmentation reaction. Product ions generated by fragmentation are then able to escape the first potential well to the first and second end electrodes 510, 512. The product ions may then be collected in an ion trap (for example C-trap 80 as per the mass spectrometer 10 shown in FIG. 1).

According to the above exemplary embodiments of the disclosure, the precursor ions are injected into the fragmentation chamber prior to the injection of the reagent ions, such that the precursor ions are confined within the first potential well. It will be appreciated that is equally possible for the reagent ions to be injected into the fragmentation chamber first such that the reagent ions are confined within the first potential well and the precursor ions subsequently confined within the second potential well according to further embodiments of this disclosure.

Advantageously, embodiments of the present disclosure may be used to provide a method of fragmenting ions, a controller for a mass spectrometer for fragmenting ions, and/or a mass spectrometer. According to the present disclosure, by providing the first potential well within the second potential well, the volume of the first ions confined within the first potential well will overlap with the volume of the ions confined within the second potential well. As the ions are of opposing charges, the resulting space charge within the elongate ion channel will be reduced. The resulting reduction in the space charge will increase ion confinement within the first and second potential well, thereby resulting in an improved fragmentation process, as increased confinement will bring about a higher rate of ion/ion interactions.

Fragmentation chambers according to the present disclosure may also be utilised for fragmenting precursor ions by other fragmentation mechanisms. According to a further embodiment of the present disclosure, a method of fragmenting ions for mass spectrometry by UVPD is provided.

Figure 9:
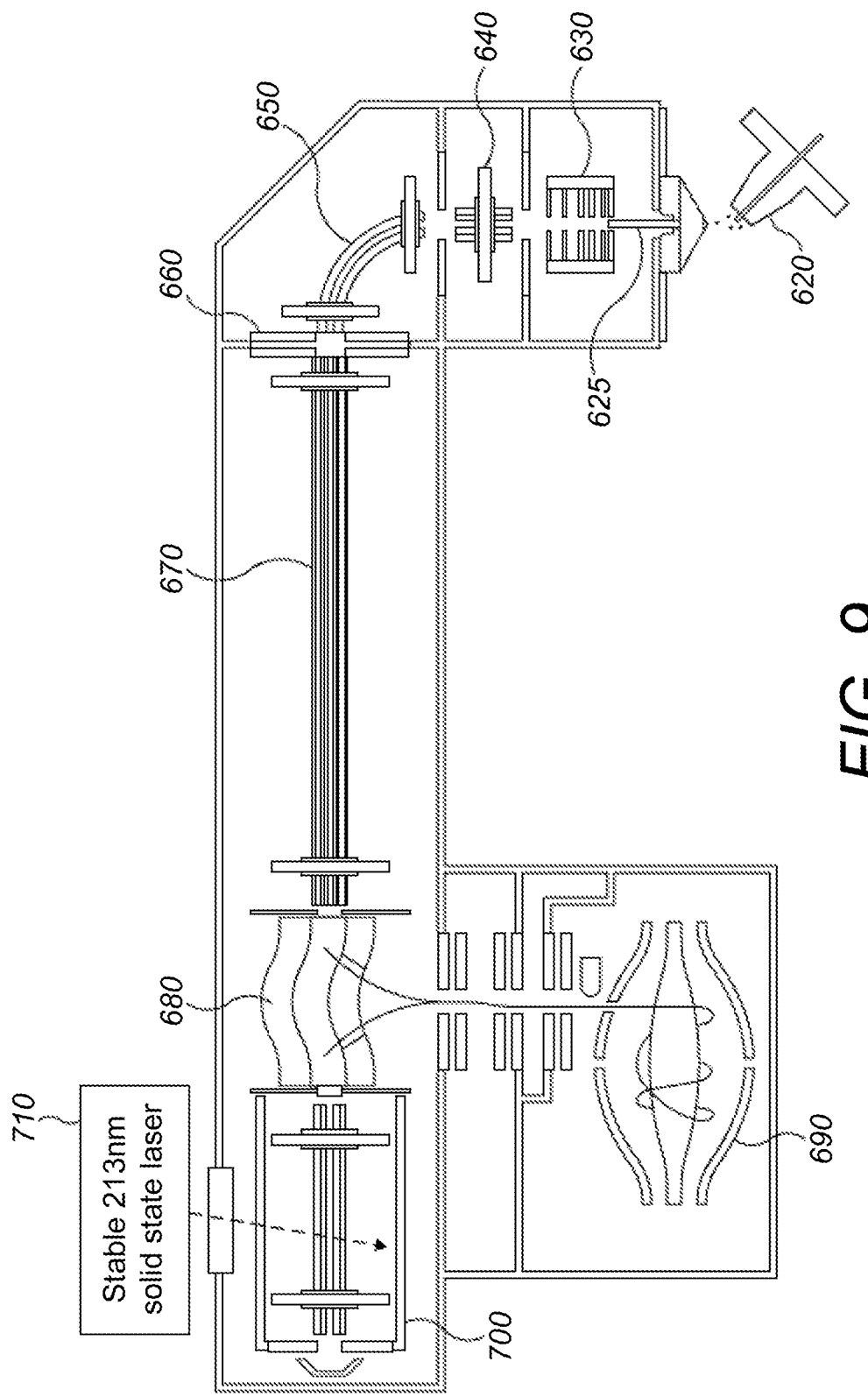
FIG. 9 shows a schematic arrangement of a mass spectrometer suitable for carrying out an exemplary UVPD fragmentation method according to this disclosure.

FIG. 9 shows a schematic arrangement of a mass spectrometer 600 suitable for carrying out a UVPD fragmentation method according to this disclosure. As shown in FIG. 9, the mass spectrometer 600 comprises an ESI source 620, and ion transportation means for transporting ions from the ESI source 620 to an extraction trap 680. Similar to the embodiment shown in FIG. 1, the ion transportation means comprises a capillary 625, an RF-only S lens 630, an injection flatapole 640, a bent flatapole 650, an ion gate 660, and a transport multipole 670. The ion transportation means may be controlled by a controller (not shown) in a substantially similar manner to the methods described above. The extraction chamber 680 may direct ions into a mass analyser 690, or into a fragmentation chamber 700 depending on whether an MS1 or MS2 analysis of precursor ions is desired.

The mass spectrometer 600 also includes an ultraviolet radiation source 710. The ultraviolet radiation source 710 is positioned with respect to the fragmentation chamber 700 in order to irradiate the elongate ion channel of the fragmentation chamber with UV radiation. It will be understood that the ultraviolet radiation source produces electromagnetic radiation with a wavelength of at least 10 nm and no greater than 400 nm. Preferably, the ultraviolet radiation source produces electromagnetic radiation with a wavelength of at least: 150 nm, 175 nm, or 200 nm. Preferably the ultraviolet radiation source produces electromagnetic radiation with a wavelength of no greater than 300 nm, 275 nm or 250 nm. Preferably, the ultraviolet radiation source is provided by a laser radiation source. The laser may be operated in a continuous wave-mode of operation or a pulsed mode of operation. For example, the ultraviolet radiation source may be diode pumped solid state laser which produces radiation with a wavelength of 213 nm. The exemplary diode pumped solid state laser may be operated in a pulsed mode of operation, with pulses having an energy of 3 µJ per pulse being supplied at a frequency of 2.5 kHz (i.e. 2500 pulses supplied per second) to the fragmentation chamber.

Figure 10:
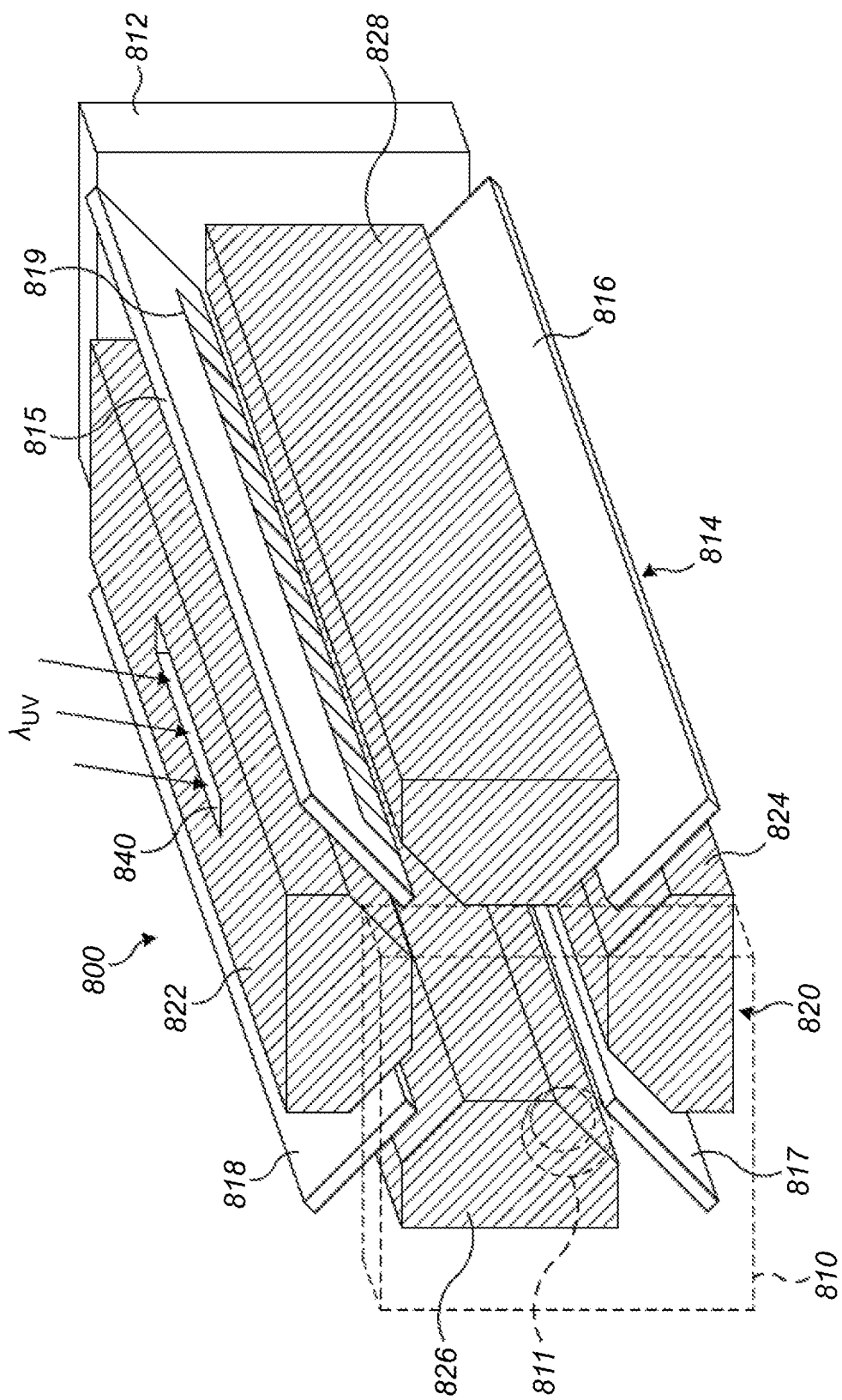
FIG. 10 shows a schematic diagram of an exemplary fragmentation chamber suitable for carrying out a UVPD fragmentation process according to this disclosure.

FIG. 10 shows a schematic diagram of an exemplary fragmentation chamber 800 suitable for carrying out a UVPD fragmentation process according to this disclosure. As such, the fragmentation chamber 800 is an example of a fragmentation chamber 700 as shown in the mass spectrometer 600 of FIG. 9.

The fragmentation chamber 800 as shown in FIG. 10 comprises a first end electrode 810, a second end electrode 812, an elongate printed circuit board (PCB) electrode assembly 814 and an elongate multipole electrode assembly 820. The elongate multipole electrode assembly 820 and PCB electrode assembly 814 are arranged between the first end electrode 810 and the second end electrode 812.

The first end electrode 810 and the second end electrode 812 are provided at opposing axial ends of the elongate multipole electrode assembly 820. The first end electrode 810 and the second end electrode 812 may be provided as plates which extend at least substantially across a cross section of the elongate ion channel. As shown in FIG. 10, the first end electrode 810 includes an aperture 811 through the thickness of the first end electrode 810. The aperture 811 is aligned with the elongate ion channel to allow ions to be injected into the elongate ion channel and/or ejected from the elongate ion channel through the aperture 811. The second electrode 812 may also include an aperture (not shown) to allow for the injection and/or ejection of ions.

The elongate multipole electrode assembly 820 shown in FIG. 10 includes a plurality of elongate electrodes arranged about a central axis to define an elongate ion channel. The elongate multipole electrode assembly 820 as shown in FIG. 10 is an elongate quadrupole electrode assembly. The elongate multipole electrode assembly 820 includes two pairs of elongate electrodes 822, 824, 826, 828 A first pair of elongate electrodes 822, 824 are spaced apart on opposing sides of the elongate ion channel and are aligned substantially in parallel with each other along the length of the elongate ion channel. A second pair of elongate electrodes 826, 828 are also spaced apart on opposing sides of the elongate ion channel and are aligned substantially in parallel with each other along the length of the elongate ion channel. As shown in FIG. 10, the first and second pairs of elongate electrodes 822, 824, 826, 828 have substantially flat opposing surfaces. Alternatively, the opposing surfaces may have a hyperbolic profile or any other surface profile suitable for defining an RF pseudopotential within the elongate ion channel. Accordingly, the elongate multipole electrode assembly 820 is capable of applying an RF pseudopotential to the elongate ion channel in a similar manner to the fragmentation chambers described previously.

The fragmentation chamber 800 also includes elongate PCB electrode assembly 814. As shown in FIG. 10, the elongate PCB assembly 814 is provided as four elongate PCB boards 815, 816, 817, 818. Each elongate PCB board 815, 816, 817, 818 may comprise a plurality of electrodes 819 extending along a length of the elongate PCB board electrode aligned with the elongate ion channel (electrodes 819 are shown only on PCB board 815 in the Figure but are provided on each PCB board 815, 816, 817, 818).

As such, it will be appreciated that the above described features of the fragmentation chamber 800 are substantially the same as the corresponding features of the fragmentation chamber 200 as shown in FIG. 2.

The fragmentation chamber 800 also includes an irradiation aperture 840. The irradiation aperture is positioned to allow the central region of the elongate ion channel to be irradiated by UV radiation generated by the ultraviolet radiation source 710. As shown in FIG. 10, the irradiation aperture runs through the thickness of a central region of one the first pair of elongate electrodes 822. It will be appreciated that the irradiation aperture 840 may alternatively be located on any of the elongate electrodes, or on another part of the fragmentation chamber, in order to provide a path for UV radiation to reach the elongate ion channel.

Preferably, the UV radiation provided by the ultraviolet radiation source runs in a direction substantially transverse to the elongate ion channel. As such, the path of UV radiation may not run along the length of the elongate ion channel. Accordingly, by providing the UV radiation along a path (direction) transverse to the direction of elongation of the elongate ion channel, the UV radiation may only irradiate a portion of the elongate ion channel. For example, the UV radiation may be provided to substantially irradiate a first volume of the ion channel. As such, the elongate ion channel includes at least one axially offset (third) volume of the elongate ion channel which is not exposed to UV radiation. For example, the source of UV radiation may be provided perpendicular to the direction of elongation, or at any other angle such that distinct irradiated and non-irradiated regions may be provided.

An irradiation aperture may also be provided on the opposing elongate electrode 824 in order to allow the UV radiation to leave the elongate ion channel (i.e. prevent undesired reflections) and/or to provide symmetrical electrode to the electrode including the irradiation aperture 840 for the purposes of providing a symmetrical electric field.

Next, an exemplary embodiment of the method of fragmenting precursor ions by UVPD will be described with reference to the mass spectrometer 600 shown in FIG. 9 and the fragmentation chamber 800 shown in FIG. 10.

The mass spectrometer 600 is under the control of a controller (not shown) which, for example, is configured to control the generation of ions in the ESI source 620, to set the appropriate potentials on the electrodes of the ion transport means described above (transport quadrupole 670 etc) so as to guide, focus, and filter (where the ion transport mean comprises a mass filter) the ions, to capture the mass spectral data from the mass analyser 690 and so forth. It will be appreciated that the controller may comprise a computer that may be operated according to a computer program comprising instructions to cause the mass spectrometer 600 to execute the steps of the method according to the present disclosure. As such, the controller may perform method steps substantially similar to the methods described in relation to the mass spectrometer 10 as described above.

According to the exemplary embodiment, the controller is configured to cause the ion transportation means to transport precursor ions generated by the ESI source 620 to the fragmentation chamber 700 for fragmentation by UVPD.

Figure 11A:
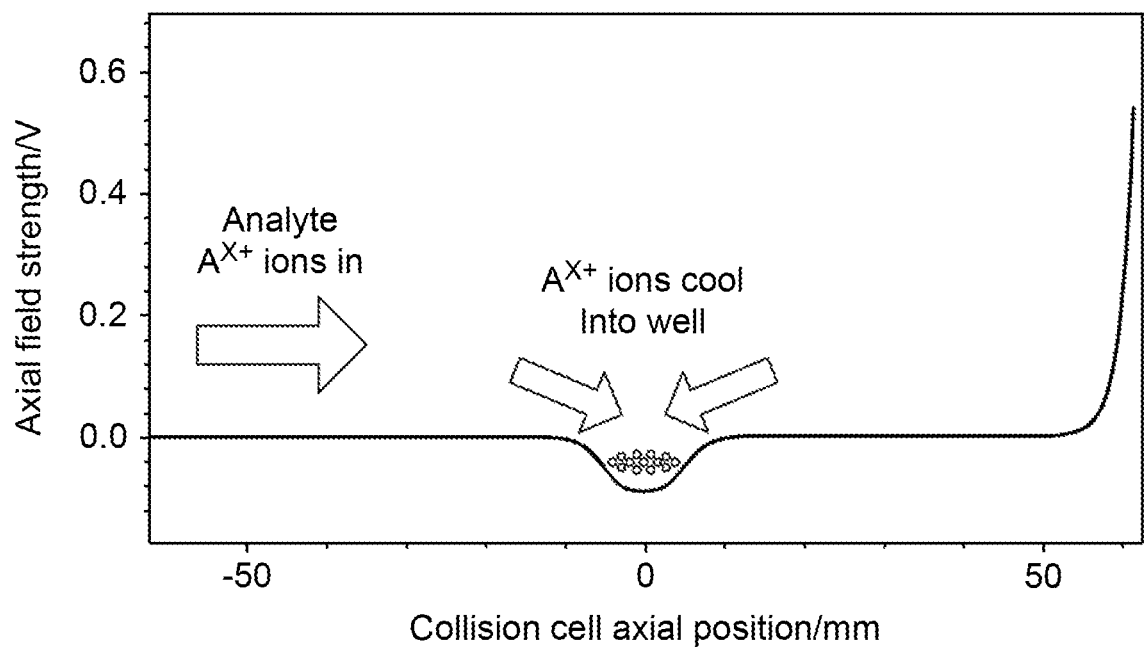
FIGS. 11A and 11B show graphical representations of the electric field along the length of the elongate ion channel within the fragmentation chamber and indications of the state of the ions within the fragmentation chamber at different time points during an exemplary embodiment of the method of UVPD fragmentation according to this disclosure.
Figure 11B:
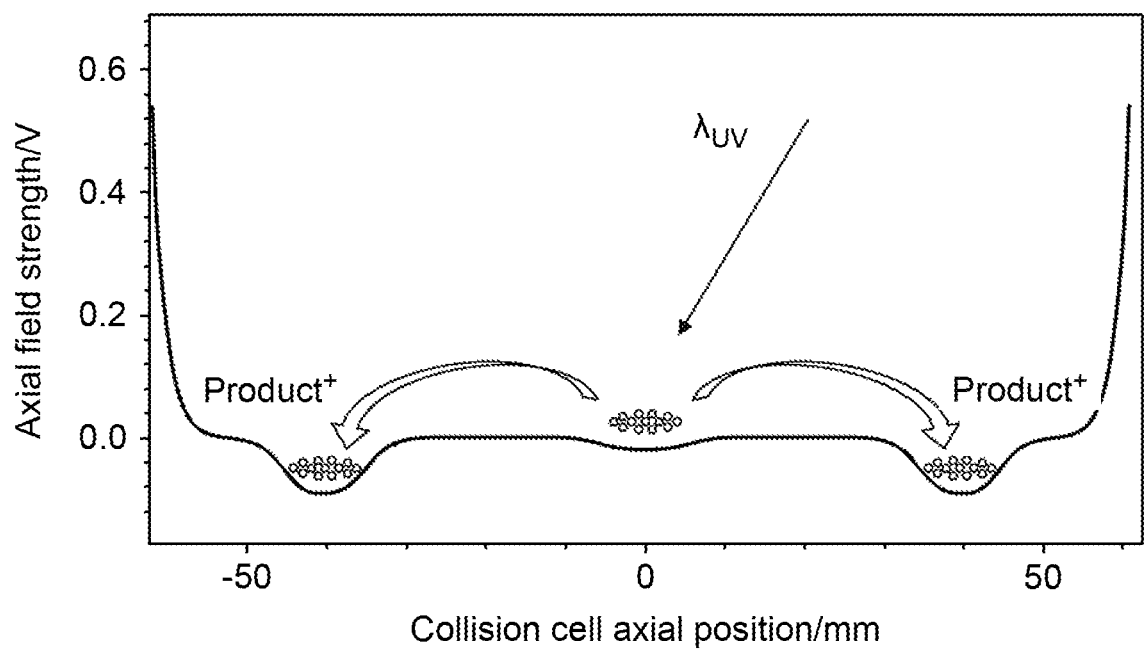

Next the control of the fragmentation chamber 700 according to the exemplary embodiment of the method will be described in more detail with reference to the fragmentation chamber 800 shown in FIG. 10. FIGS. 11A and 11B are graphical representations of the electric field along the length of the elongate ion channel within the fragmentation chamber 800 at different time points during the exemplary embodiment of the method.

The controller is configured to apply an RF pseudopotential to the elongate multipole electrode assembly 820 of the fragmentation chamber 800. For example, in the present exemplary embodiment, the DC potential of the elongate multipole assembly is set to 0 V, the frequency of the RF potential is 3 MHz, and the RF potential oscillates between −500 V and +500V.

As shown in FIG. 11A, the precursor ions are injected from a first axial end of the fragmentation chamber 800. In order to accept precursor ions into the fragmentation chamber, initially no DC bias (relative to the potential of the multipole electrode assembly) is applied to the first end electrode 810 positioned at the first axial end of the fragmentation chamber 800. In order to initially confine the injected precursor ions in the fragmentation chamber 800 the controller is configured to apply an initial DC bias to the second end electrode 812. The initial DC bias applied to the second end electrodes is of the same polarity as the charge of the precursor ions to repel the precursor ions towards the centre of the elongate ion channel. For example, an initial DC bias applied to the second end electrode 812 may be +5 V.

Once the precursor ions are contained within the ion channel, the initial DC bias may also be applied to the first end electrode 810. The initial DC bias applied to the first and second end electrodes 810, 812 acts to repel the precursor ions towards the central region of the elongate ion channel. As such, the precursor ions may be initially axially confined by the initial DC bias applied to the first and second end electrodes 810, 812.

Further, the controller is configured to apply a first DC bias to at least one first electrode of the elongate PCB electrode assembly 814. As shown in FIG. 11A, the first DC bias applied to the first electrode defines a first potential well within the elongate ion channel. As such the first potential well is defined by a first DC bias applied to a first electrode with respect to the elongate multipole electrode assembly 820. The first electrode may be positioned in a substantially central region of the elongate ion channel in order to confine the precursor ions in a substantially central region of the elongate ion channel. The first DC bias may be provided independently to the DC potential of the multipole electrode assembly 820. The first DC bias is of an opposing polarity to the initial DC bias, and thus of an opposing polarity to the precursor ions. The magnitude of the first DC bias applied to the first electrode may be less than the magnitude of the initial DC bias applied to the first and second end electrodes 810, 812. For example, the first DC bias may be −0.5 V.

By applying a first DC bias to the first electrode (with respect to the DC potential of the elongate multipole electrode assembly 220), a first potential well is formed in the central region of the elongate ion channel which confines the precursor ions in a central region of the elongate ion channel.

A cooling gas may also be provided within the fragmentation chamber. The cooling gas allows the precursor ions confined within the first potential well to cool at a faster rate through interactions with the molecules of the cooling gas. Preferably, the cooling gas is an inert gas. For example, the cooling gas may be Nitrogen gas ($N_2$) or a Noble gas (such as He). Preferably, a pressure for the cooling gas is at least 0.1 Pa. Preferably, a pressure for the cooling gas is no greater than 2 Pa. Once the precursor ions are confined within the first potential well, a cooling time period may be provided to allow the precursor ions to cool through a reduction in their kinetic energy.

As such, the method steps described above for injecting precursor ions into a fragmentation chamber and confining the precursor ions in a first potential well are substantially similar to the corresponding method steps described in the other embodiments of the disclosure. Accordingly, variations to the above described method and fragmentation chamber 800 will be readily apparent based on the methods and fragmentation chambers described in this disclosure.

Next, the controller is configured to apply a second DC bias to opposing second electrodes of the elongate PCB electrode assembly 814. As such, a second potential well is defined by the second DC biases applied to the opposing second electrodes with respect to the elongate multipole assembly 820. As such, the second potential well formed in the fragmentation chamber 800 may be substantially similar to the second potential well of the other fragmentation chambers according to this disclosure.

The controller is also configured to cause the ultraviolet radiation source 710 to emit UV radiation which irradiates the elongate ion channel. The ultraviolet radiation source 710 is preferably configured to irradiate a substantial portion of the volume of the precursor ions confined within the potential well. Preferably, the ultraviolet radiation source 710 is substantially focused on the volume of the elongate ion channel corresponding to the first potential well. Preferably, said volume is a central region of the elongate ion channel. As such, there may be opposing, outer, axial regions of the elongate ion channel which are not exposed to the UV radiation.

By exposing the precursor ions to the UV radiation, the precursor ions may absorb the UV radiation and undergo a fragmentation reaction. As such, the precursor ions may dissociate into product ions as a result of the absorption of UV radiation. The product ions generated will be of a similar polarity to the precursor ions.

Further, as shown in FIG. 11B, the product ions generated by the UVPD reaction may escape the first potential well. This is because the product ions are of lower charge than the precursor ions and may be more energetic than the precursor ions. Thus, the product ions may be able to escape the relatively shallow first potential well, and be attracted towards the axial ends of the fragmentation chamber due to the opposing second DC biases of the second potential well. This reduces or minimises the time the product ions are further exposed UV radiation within a substantially central region of the elongate ion channel, such that further fragmentation of the product ions may be reduced, minimised or prevented. As such, the method of UVPD fragmentation according to the exemplary embodiment may be self-quenching, as the precursor ions are fragmented into product ions, which then leave the irradiated region of the elongate ion channel.

A time period for irradiating the precursor ions with UV radiation in order to fragment the ions may be at least 0.1 ms. More preferably, the time period may be at least: 1 ms, 2 ms, 3 ms, or 4 ms. Preferably, the time period may be no greater than: 10 ms, 9 ms, or 8 ms. For example, the time period may be 5 ms.

As shown in FIG. 11B, the DC potential along the axial length of the elongate PCB electrode assembly 814 during a fragmentation reaction may include one or more third potential wells for collecting the product ions. The third potential wells are of the same polarity as the first potential well, and of opposing polarity to the second potential well. The third potential wells are spaced apart from the first potential well. The third potential wells are spaced apart on opposing sides of the second potential well. The third potential wells may be formed by DC biases, at least in part, applied to the plurality of electrodes 819 in the elongate PCB electrode assembly 814 and/or the first and second end electrodes 810, 812 of the fragmentation chamber. For example, the elongate multipole assembly may extend in the axial direction of the elongate ion channel beyond the second electrodes. As such the third potential wells may be defined by the second DC bias applied to the second electrodes with respect to the DC potential of the elongate multipole assembly on either axial side of the second electrodes. As such, the third potential wells are formed adjacent to the second potential well and spaced apart axially from the first potential well.

It will be appreciated that by spacing the third potential well(s) apart from the first potential well, the volume(s) of the elongate ion channel which are subjected to the third potential well(s) are not substantially exposed to UV radiation. Thus, product ions trapped within the third potential wells may not be subjected to further UVPD reactions. In some embodiments, only one third potential well may be formed towards one axial end of the elongate ion channel. More preferably, third potential wells are formed on opposing axial sides of the first potential well as shown in FIG. 11B. As such, it will be appreciated that the fragmentation chamber 800 may be biased in a similar manner as other fragmentation chambers according to this disclosure to provide one or more regions (third potential wells) for collecting product ions produced by a fragmentation reaction.

According to the exemplary method, once the precursor ions have been fragmented, the controller may cause the fragmentation chamber 700, 800 to eject the product ions generated by the fragmentation process into the extraction trap 680. This may be achieved by applying an axial potential gradient across the fragmentation chamber 700, 800 in a direction so as to eject the product ions towards the extraction trap 680. The axial potential gradient may be provided for example by applying appropriate DC biases to the plurality of electrodes 819 extending along the length of the elongate PCB boards 815, 816, 817, 818. The controller may then cause the extraction trap 680 to eject the product ions into the mass analyser 690 for mass analysis (i.e. an MS2 scan).

Accordingly, a method for fragmenting precursor ions by UVPD is described above. With reference to the other methods and fragmentation chambers described in this disclosure, further modifications of the method described above, or the fragmentation chamber 700, 800 will be readily apparent. For example, the fragmentation chambers as described with reference to any of FIG. 2, 6, 7, or 8 may be readily modified to incorporate an ultraviolet radiation source which irradiates volume a corresponding to the first potential well of said fragmentation chambers.

Advantageously, the above described fragmentation chambers provide a method of UVPD fragmentation in which the fragmentation reaction is quenched through the application of DC potentials. As such, the quenching mechanism for the UVPD reaction may be effective for product ions of any mass to charge ratio, in particular for product ions which have a similar mass to charge ratio as the precursor ions. It is understood that fragmentation of multiply charged precursor ions may generate product ions of lower mass and lower charge, thereby having a similar mass to charge ratio.

In an alternative embodiment of the UVPD fragmentation chamber, the elongate multipole electrode assembly may be provided in a curved form. As such, the elongate ion channel defined by the elongate multipole electrode assembly may be curved. For example, the elongate ion channel may be provided in a C-shape (i.e. a C-trap) or a horseshoe shape. By providing the elongate ion channel in a curved shape, the direction of UV radiation may be provided in a direction which is substantially aligned with the direction of elongation of the elongate ion channel at a point along the axial length of the elongate ion channel. For example the UV radiation may be aligned with the elongate ion channel in a central region of the elongate ion channel. As such, the UV radiation may be provided tangentially to the elongate ion channel. As the elongate ion channel is curved in this alternative embodiment, a region of the elongate ion channel at one or both axial ends may not be exposed to the UV radiation, whilst another region of the elongate ion channel is exposed to UV radiation. For example, an axially central region of a curved fragmentation chamber (curved elongate multipole electrode assembly) may have a central volume of the elongate channel which is exposed to UV radiation whilst volumes of the elongate ion channel at the axial ends of the curved fragmentation chamber may not be exposed to UV radiation.

It will be appreciated that the present disclosure is not limited to the embodiments described above and that modifications and variations on the embodiments described above will be readily apparent to the skilled person. Features of the embodiments described above may be combined in any suitable combination with features of other embodiments described above as would be readily apparent to the skilled person and the specific combinations of features described in the above embodiments should not be understood to be limiting.

The invention claimed is:

1. A method of fragmenting ions for mass spectrometry comprising:
    injecting an amount of first ions of a first charge into an ion trap, the ion trap including an elongate multipole electrode assembly arranged to define an elongate ion channel;
    wherein the first ions are radially confined within the elongate ion channel by applying an RF pseudopotential to the elongate multipole electrode assembly and axially confined to a first volume within the ion channel by applying a first potential well to the elongate ion channel;
    after a specified pre-cooling time period, injecting an amount of second ions of a second charge opposite to the first charge into the ion trap;
    wherein the second ions are axially confined to a second volume within the elongate ion channel by applying a second potential well to the elongate ion channel wherein the first potential well is provided within the second potential well;
    cooling the second ions in the ion trap and allowing the first ions and the second ions to interact such that the first ions and/or the second ions are fragmented to produce product ions; and
    providing at least one third potential well to axially confine the product ions, the third potential well having a polarity matching a polarity of the first potential well and adjacent to the second potential well.

2. A method according to claim 1 wherein:
    a magnitude of the at least one third potential well is greater than the magnitude of the first potential well.

3. A method according to claim 1 wherein:
    the providing of the at least one third potential well comprises providing a respective third potential well adjacent to each opposing side of the second potential well in the axial direction of the elongate ion channel.

4. A method according to claim 1 wherein:
    the elongate multipole assembly extends in the axial direction beyond a second electrode such that the at least one third potential well is defined by the second DC bias applied to one of the second electrodes with respect to the DC potential of elongate multipole assembly.

5. A method of fragmenting ions for mass spectrometry comprising:
    injecting an amount of first ions of a first charge into an ion trap; the ion trap including an elongate multipole electrode assembly arranged to define an elongate ion channel;
    wherein the first, ions are radially confined within the elongate ion channel by applying an RF pseudopotential to the elongate multipole electrode assembly and axially confined to a first volume within the ion channel by applying a first potential well to the elongate ion channel;
    injecting an amount of second ions of a second charge opposite to the first charge into the ion trap;
    wherein the second ions are axially confined to a second volume within the elongate ion channel by applying a second potential well to the elongate ion channel wherein the first potential well is provided within the second potential well;
    providing at least one third potential well to axially confine product ions within the ion trap, the third potential well having a polarity matching a polarity of the first potential well and adjacent to the second potential well; and
    cooling the first ions and the second ions in the ion trap and allowing the first ions and the second ions to interact such that the first ions and/or the second ions are fragmented to produce the product ions.

6. A method of fragmenting precursor ions according to claim 5 wherein:
    the first potential well is defined by a first DC bias applied to at least one first electrode with respect to a DC potential of the elongate multipole electrode assembly; and
    the second potential well is defined by second DC biases applied to axially opposing second electrodes with respect to the DC potential of the elongate multipole assembly.

7. A method of fragmenting precursor ions according to claim 6 wherein:

the at least one first electrode is positioned in a substantially central region of the second potential well.

8. A method according to claim 5 wherein:
a magnitude of the second potential well is greater than a magnitude of the first potential well.

9. A method according to claim 5 wherein:
the first ions and/or the second ions are injected into the ion trap from an axial end of the ion trap.

10. A method according to claim 5 wherein:
the second ions have a lower electron affinity than the first ions.

11. A method according to claim 5 wherein:
a magnitude of the at least one third potential well is greater than the magnitude of the first potential well.

12. A method according to claim 5 wherein:
the providing of the at least one third potential well comprises providing a respective third potential well adjacent to each opposing side of the second potential well in the axial direction of the elongate ion channel.

13. A method according to claim 5 wherein:
the elongate multipole assembly extends in the axial direction beyond a second electrode such that the at least one third potential well is defined by the second DC bias applied to one of the second electrodes with respect to the DC potential of elongate multipole assembly.

* * * * *